United States Patent
Matolia et al.

(10) Patent No.: US 11,758,451 B2
(45) Date of Patent: *Sep. 12, 2023

(54) SCANNING OPTIMIZATION IN 5G NR MULTI-RAT ENVIRONMENTS

(71) Applicant: APPLE INC., Cupertino, CA (US)

(72) Inventors: Rohit R. Matolia, Karnataka (IN); Alosious Pradeep Prabhakar, Singapore (SG); Vijay Venkataraman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,903

(22) Filed: Sep. 23, 2022

(65) Prior Publication Data

US 2023/0016046 A1 Jan. 19, 2023

Related U.S. Application Data

(63) Continuation of application No. 17/239,160, filed on Apr. 23, 2021, now Pat. No. 11,490,302.

(30) Foreign Application Priority Data

Apr. 30, 2020 (IN) .............................. 202041018447

(51) Int. Cl.
*H04W 36/24* (2009.01)
*H04W 36/00* (2009.01)
(Continued)

(52) U.S. Cl.
CPC . *H04W 36/00837* (2018.08); *H04W 36/0085* (2018.08); *H04W 36/00835* (2018.08);
(Continued)

(58) Field of Classification Search
CPC ..... H04W 36/00837; H04W 36/00835; H04W 36/0085; H04W 36/125; H04W 36/24
See application file for complete search history.

(56) References Cited

U.S. PATENT DOCUMENTS 11,490,302 B2 * 11/2022 Matolia ............... H04W 36/125
2019/0069229 A1 2/2019 Lee et al.
(Continued)

FOREIGN PATENT DOCUMENTS

EP 3512225 A1 7/2019
IN 201827001432 A 4/2018

OTHER PUBLICATIONS

U.S. Appl. No. 17/239,160, Notice of Allowance, dated Aug. 2, 2022, 10 pages.

*Primary Examiner* — Barry W Taylor
(74) *Attorney, Agent, or Firm* — Dorsey & Whitney LLP

(57) ABSTRACT

Systems and methods are provided to improve candidate search and measurement in non-standalone (NSA) and standalone (SA) 5G new radio (NR) multi-radio access technology (RAT) environments. For Evolved Universal Terrestrial Radio Access Network (E-UTRAN) NR-dual connectivity (EN-DC), a user equipment (UE) skips 5G band measurements for an initial search or an out-of-service (OOS) search. For SA dual connectivity, the UE avoids 5G remaining band (RBS) scans and limits 5G deviated band search (DBS) scans to bands configured for the carrier.

20 Claims, 15 Drawing Sheets

(51) Int. Cl.
*H04W 36/12* (2009.01)
*H04W 76/27* (2018.01)

(52) U.S. Cl.
CPC ......... *H04W 36/125* (2018.08); *H04W 36/24* (2013.01); *H04W 76/27* (2018.02)

(56) References Cited

U.S. PATENT DOCUMENTS

| | | | |
|---|---|---|---|
| 2020/0052916 | A1 | 2/2020 | Kaki et al. |
| 2020/0389828 | A1 | 12/2020 | Venkataraman et al. |
| 2021/0007025 | A1* | 1/2021 | Kumar ................... H04W 8/245 |
| 2021/0120609 | A1* | 4/2021 | Tu ......................... H04W 24/10 |
| 2021/0227450 | A1* | 7/2021 | Chun ..................... H04W 48/20 |
| 2021/0368568 | A1* | 11/2021 | Jangid ..................... H04L 1/203 |
| 2022/0015020 | A1 | 1/2022 | Määttänen et al. |
| 2022/0015029 | A1 | 1/2022 | Wang et al. |
| 2022/0159562 | A1* | 5/2022 | Yoon ..................... H04W 76/10 |
| 2022/0159783 | A1 | 5/2022 | Mohammed et al. |
| 2022/0167226 | A1 | 5/2022 | Chin et al. |
| 2022/0248487 | A1* | 8/2022 | Wang ................. H04W 36/0085 |
| 2022/0312285 | A1* | 9/2022 | Xu ..................... H04W 36/0061 |
| 2022/0338080 | A1* | 10/2022 | Youtz ................... H04W 36/06 |

* cited by examiner

SCANNING OPTIMIZATION IN 5G NR MULTI-RAT ENVIRONMENTS

TECHNICAL FIELD

This application relates generally to wireless communication systems, and more specifically to limiting candidate search and measurements for power savings in a multi-RAT environment.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
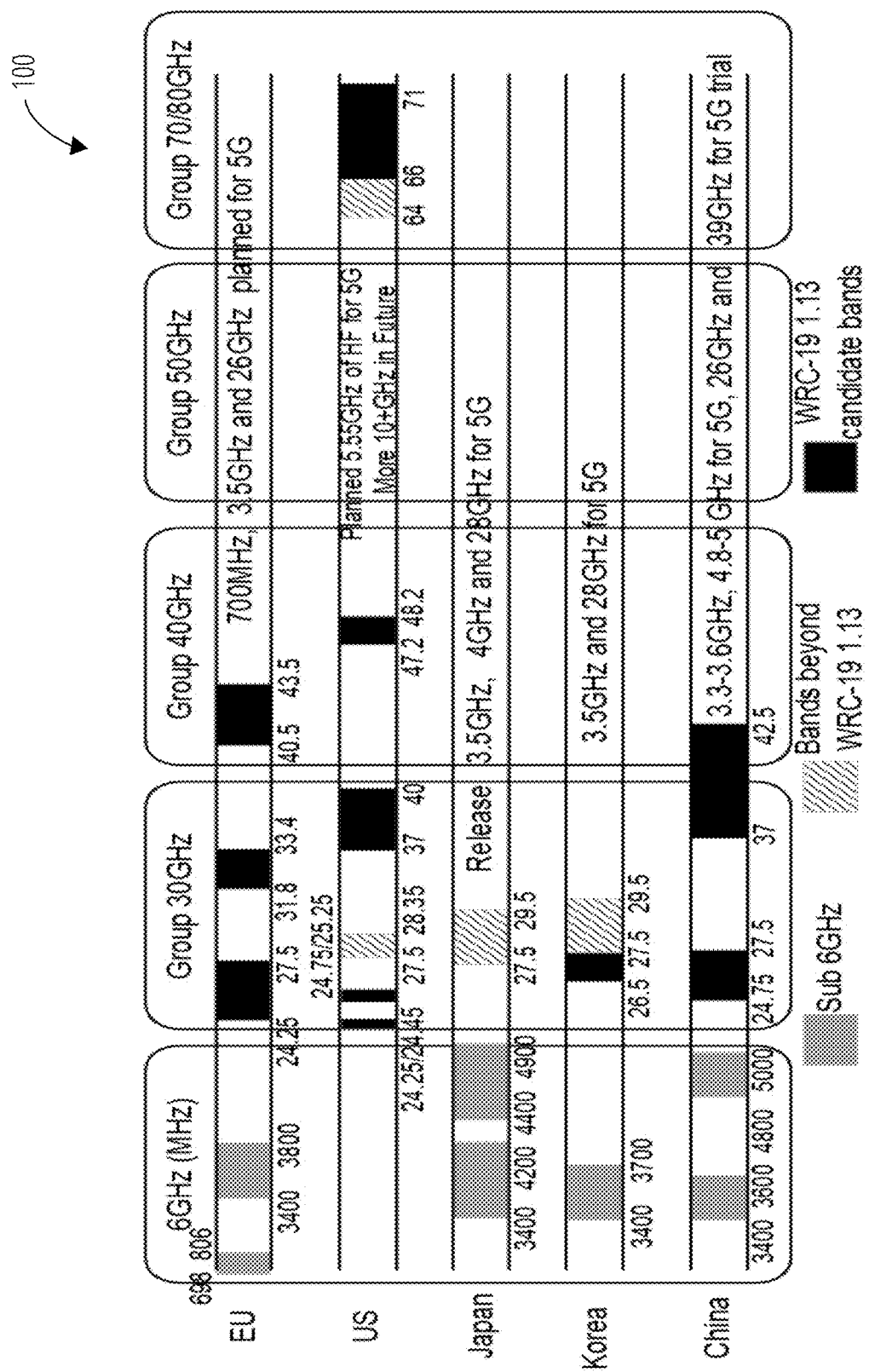
FIG. 1 illustrates example frequency spectrum ranges for 5G NR frequencies in accordance with one embodiment.

FIG. 1 illustrates an example frequency spectrum range 100 for 5G NR frequencies currently being used or considered in various regions or countries (i.e., EU, US, Japan, Korea, and China). As shown, 5G NR systems may provide many frequencies in large frequency bands. Thus, a UE in 5G may use substantially more time and power for radio resource control (RRC) Idle mode searching, or initial or out-of-service (OOS) searching, as compared to searching in other RATs (e.g., 4G, 3G, and/or 2G).

Thus, embodiments herein limit candidate search and measurement for power improvement or optimization in non-standalone (NSA) and standalone (SA) 5G NR multi-RAT environments. As discussed in detail below, when a UE camps on a cell, the UE checks LTE system information block 2 (SIB2-LTE) for an upper layer indication (Upper-Layerindication) information element (IE), which indicates that the network supports NSA operation wherein LTE provides the primary cell and the 5G NSA cell is released when the UE goes to the RRC Idle state. For NSA operation, the UE may limit searching to legacy RAT (e.g., 4G, 3G, and/or 2G) frequency bands and not perform first searching on 5G frequency bands. Such optimization for NSA operation may take international and national roaming partnerships into consideration.

In certain embodiments for SA operation, where the UE checks for a preferred carrier, or where the UE has prior information about supported bands, the UE limits initial, OOS, and/or radio link failure (RLF) scans to only carrier provided frequencies and frequencies available from other RAT reselection information. In addition, or in other embodiments, the UE checks if it is an RRC Idle state wherein the camped frequency is in FR1 and is above a threshold. When FR2 has a higher priority or is configured to be scanned, the UE avoids scanning FR2 as it consumes higher power and may not be required if FR1 is sufficient to monitor paging.

Thus, embodiments disclosed herein for NSA and SA operation in multi-RAT environments provide better mobility and battery performance. The disclosed embodiments may also provide fast OOS and/or RLF recovery on contacted carriers where prior information is known about supported bands. Carriers may have first camping to LTE and then reselection to 5G. However, mobile devices may be provided with on demand 5G speed (with acceptable RRC Idle to RRC Connected ping delay).

RRC Idle mode searching may be used for cell selection and reselection. For example, when a UE is switched on, a public land mobile network (PLMN) may be selected by the non-access stratum (NAS). One or more associated RAT may be set for the selected PLMN. The NAS may provide a list of equivalent PLMNs, if available, that the access stratum (AS) may use for cell selection and reselection. With cell reselection, the UE searches for a suitable cell of the selected PLMN, chooses that cell to provide available services, and monitors its control channel. This procedure may be referred to as "camping on the cell." The UE may, if necessary, then register its presence in the tracking area of the chosen cell. If the UE finds a more suitable cell, according to the cell reselection criteria, the UE may reselect onto that cell and camp on it. The UE may search for higher priority PLMNs at regular time intervals.

If the UE goes out-of-service (OOS), it may attempt to reacquire service by executing an OOS search algorithm. In the OOS search algorithm a balance is typically desired between power usage and acquisition performance. In order to conserve power states while executing the OOS search algorithm, the UE may alternate between operating in a scanning state, which may expend power but allow for service acquisition, and operating in a sleeping state, which may conserve power but delay service acquisition.

Figure 2:
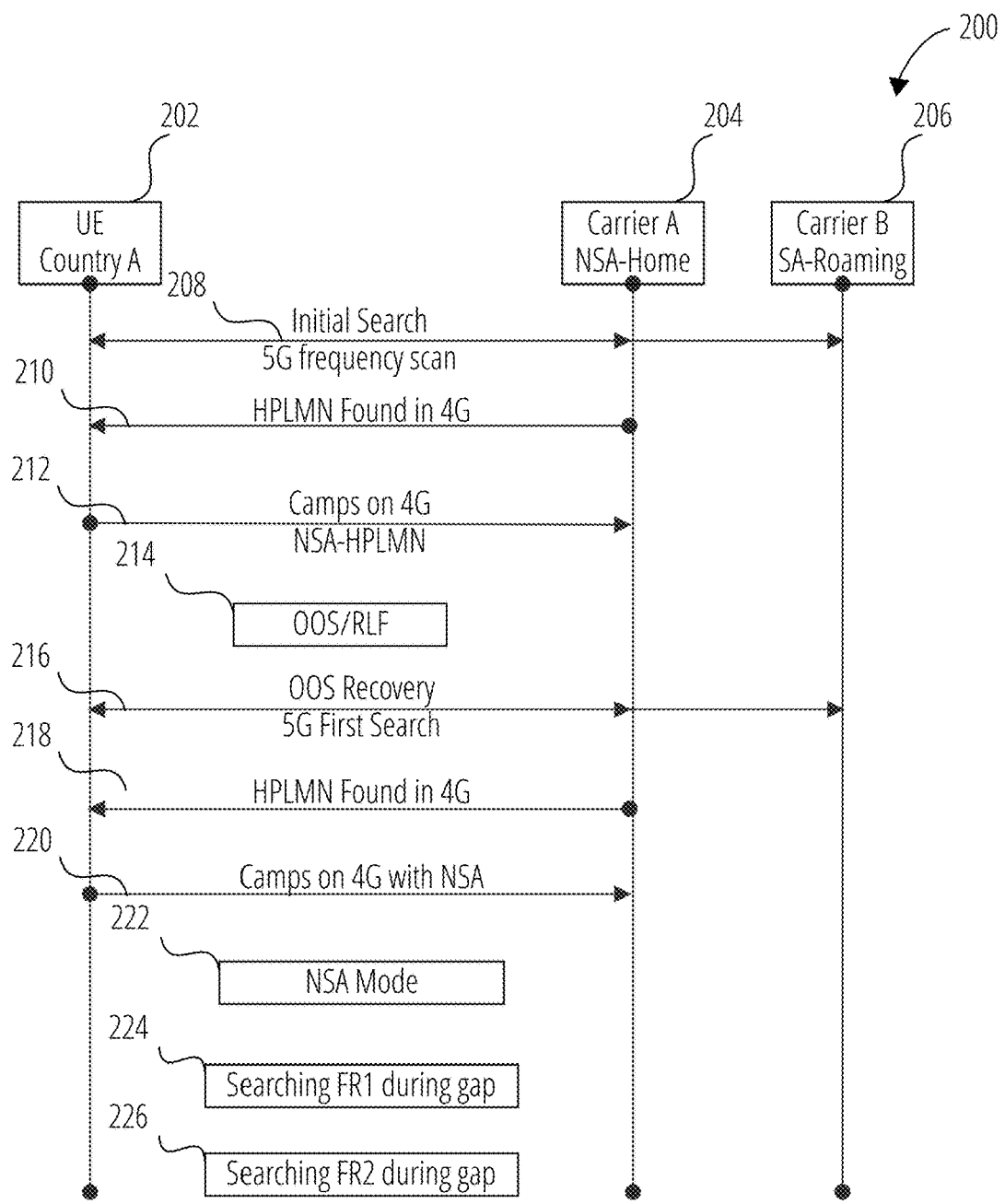
FIG. 2 illustrates a signaling diagram or an example scenario that may be covered in accordance with one embodiment.

FIG. 2 illustrates a signaling diagram 200 for an example scenario that may be covered according to certain embodiments. In this example, a UE 202 in country A may camp on Carrier A 204 configured for NSA operation in a home PLMN (HPLMN) and Carrier B 206 may provide SA operation in a visited PLMN configured for international or domestic roaming partnership with the HPLMN). However, the Carrier B 206 may cause undesired operations.

The UE 202 may perform an initial search 208 including a 5G frequency scan for the Carrier A 204 and the Carrier B 206. As discussed above, due to the many 5G frequencies in large frequency bands, the 5G frequency scan of the initial search 208 may cause battery drain and unnecessary delay. The UE 202 may find 210 the HPLMN (Carrier A 204) in 4G and camp 212 on 4G for NSA operation with the HPLMN. At some point, however, the UE 202 may experience an OOS/RLF condition 214 and attempt an OOS recovery 216 process by performing a 5G first search on the Carrier A 204 and the Carrier B 206. Again, the 5G first search may cause battery drain and unnecessary delay. The UE 202 may find 218 the HPLMN in 4G and camp 220 on 4G with NSA. During NSA mode 222 operation, the UE 202 may be configured to perform searching 224 on FR1 during a gap and searching 226 on FR2 during a gap. Searching 226 on FR2 during the gap, however, may cause additional battery drain and unnecessary delay due to the many 5G frequencies in large frequency bands in FR2. Thus, certain embodiments herein provide smart handling of parameters to avoid such battery consumption and delays caused by the 5G frequency scan of the initial search 208, the 5G first search during OOS recovery 216, and/or the searching 226 FR2 during the gap.

Figure 3:
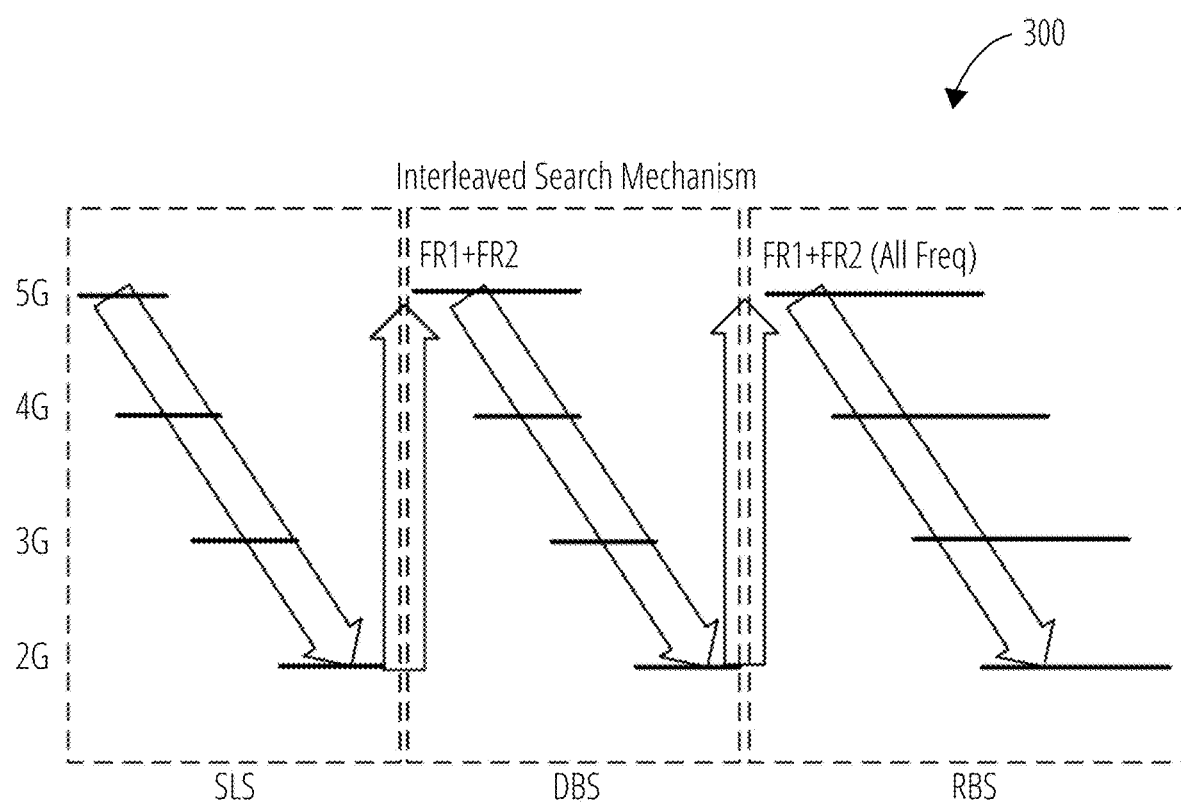
FIG. 3 illustrates an interleaved search in accordance with one embodiment.

FIG. 3 shows an example interleaved search 300 to illustrate problems that may arise due to too many RATs or frequencies. In certain search algorithms, frequency scans are split into a short list search (SLS) scan, derived band search (DBS) scan, and remaining band search (RBS) scan. The SLS scan may include the most recently used frequencies stored in the UE, which may be useful for short OOS scenarios. The SLS scans may be of a significantly shorter duration than that of the DBS scans and hence may be performed at a faster rate. The DBS scans may be performed on bands likely to be found in the last camped area or when a UE has information on bands available in a new area (e.g., state or country). The DBS scans may be of a shorter duration than the RBS scans. The RBS scans may be performed every x number of DBS scans or when a suitable cell is not found using the SLS or DBS scans. The RBS scans may include all remaining frequencies of all bands of a particular RAT and therefore may use a significant amount of time and battery, especially for the 5G NR bands.

With the introduction of 5G NR, there may be four RATs (2G/3G/4G/5G) available to search and multiple frequencies and frequency bands corresponding to each technology. Further, for 5G NR, there are frequencies ranging from FR 1 (sub 6 GHz) to FR 2 (mmWave). This extends the horizon of the search algorithm and the UE's power consumption associated with the search algorithm. As indicated by the arrows shown in FIG. 3, the example interleaved search 300 may proceed from SLS scans to DBS scans to RBS scans, and within each type of scan may proceed from 5G bands to 4G bands to 3G bands to 2G bands (or per SIM card RAT preference). The power and time consideration for searching all frequencies and bands on all technologies may not be best suited for end users. Thus, embodiments herein provide search optimizations and modifications from the UE side.

Figure 4:
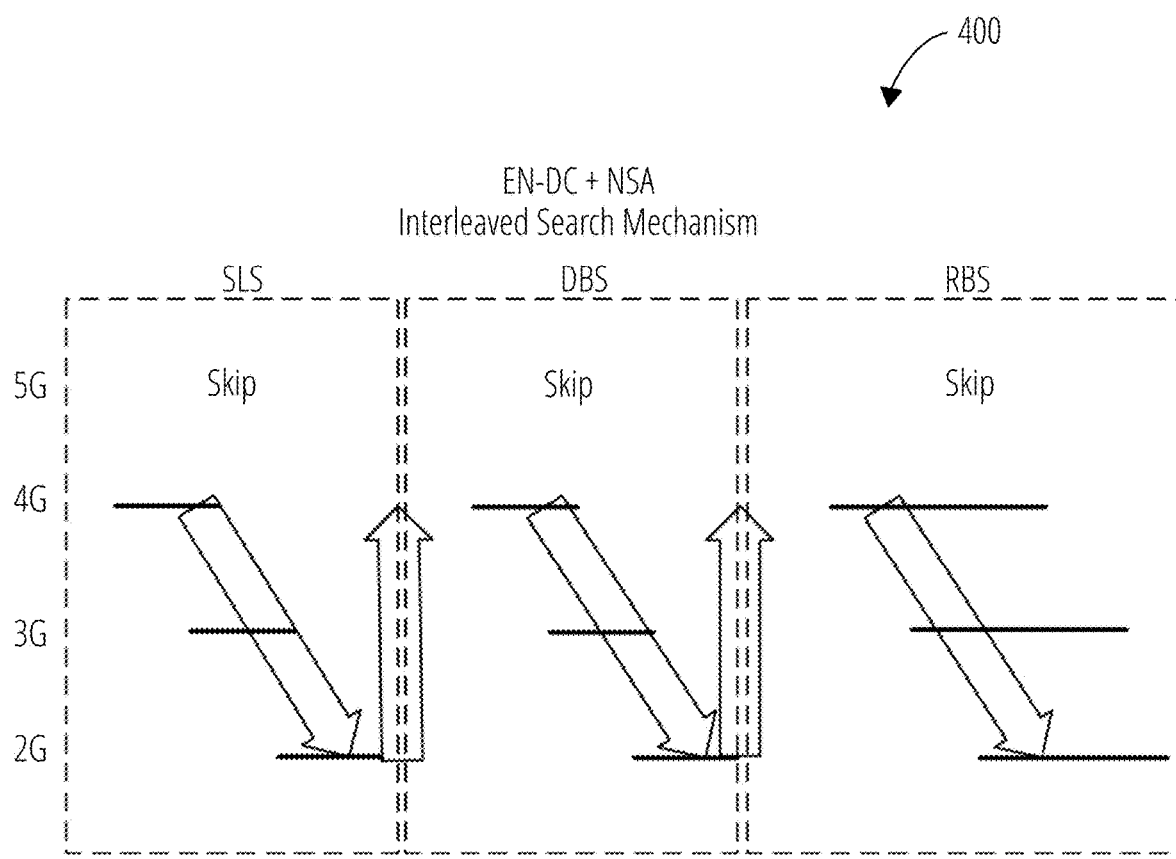
FIG. 4 illustrates an NSA EN-DC search in accordance with one embodiment.

FIG. 4 illustrates an NSA EN-DC search 400 according to one embodiment for limiting search range and prioritizing frequency bands. A UE may check to determine whether the carrier supports EN-DC and NSA operation. The EN-DC with NSA provides dual connectivity with an LTE evolved packet core (EPC) network using an MeNB with LTE as a master node for control and NAS signaling. The UE does not use a 5G frequency for the initial search and camping purpose, as the attach happens on LTE. As shown in FIG. 4, in certain embodiments, the UE skips or does not perform FR1 or FR2 5G NR frequency scans (SLS scans, DBS scans, and/or RBS scans) in case of OOS or initial search in camping. Further, the UE skips or does not perform 5G FR2 searches (SLS scans, DBS scans, and/or RBS scans) unless FR1 is not reconfigured by the MeNB in LTE or FR1 is not found.

Figure 5:
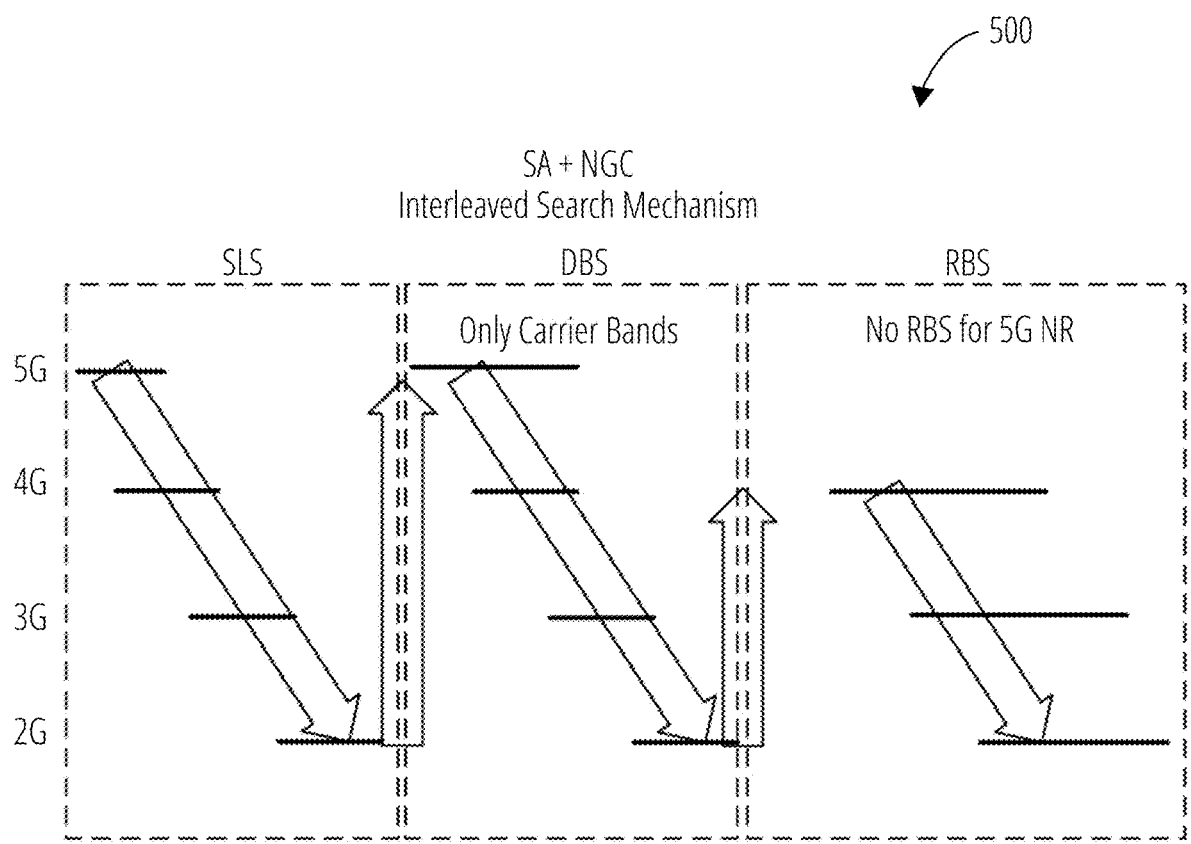
FIG. 5 illustrates an SA search in accordance with one embodiment.

FIG. 5 illustrates an SA search 500 according to one embodiment for limiting search range and prioritizing frequency bands. A UE may check to determine whether the carrier supports SA operation with a 5G next generation core (NGC) network. Such SA operation provides dual connectivity with the NGC network for standalone control signaling through the 5G core for both 5G and 4G networks. In such embodiments, the UE may use 5G frequencies for initial searching and camping. However, as shown in FIG. 5, the UE avoids RBS scans on 5G and limits DBS scans on 5G to only carrier bands (i.e., 5G bands known to be available to the carrier). In certain embodiments, the UE does not search FR1 and FR2 for all 5G frequencies in DBS or RBS.

Rather, the UE only searches carrier configured bands in DBS, if required (e.g., SLS scan did not produce a suitable 5G cell).

Figure 6:
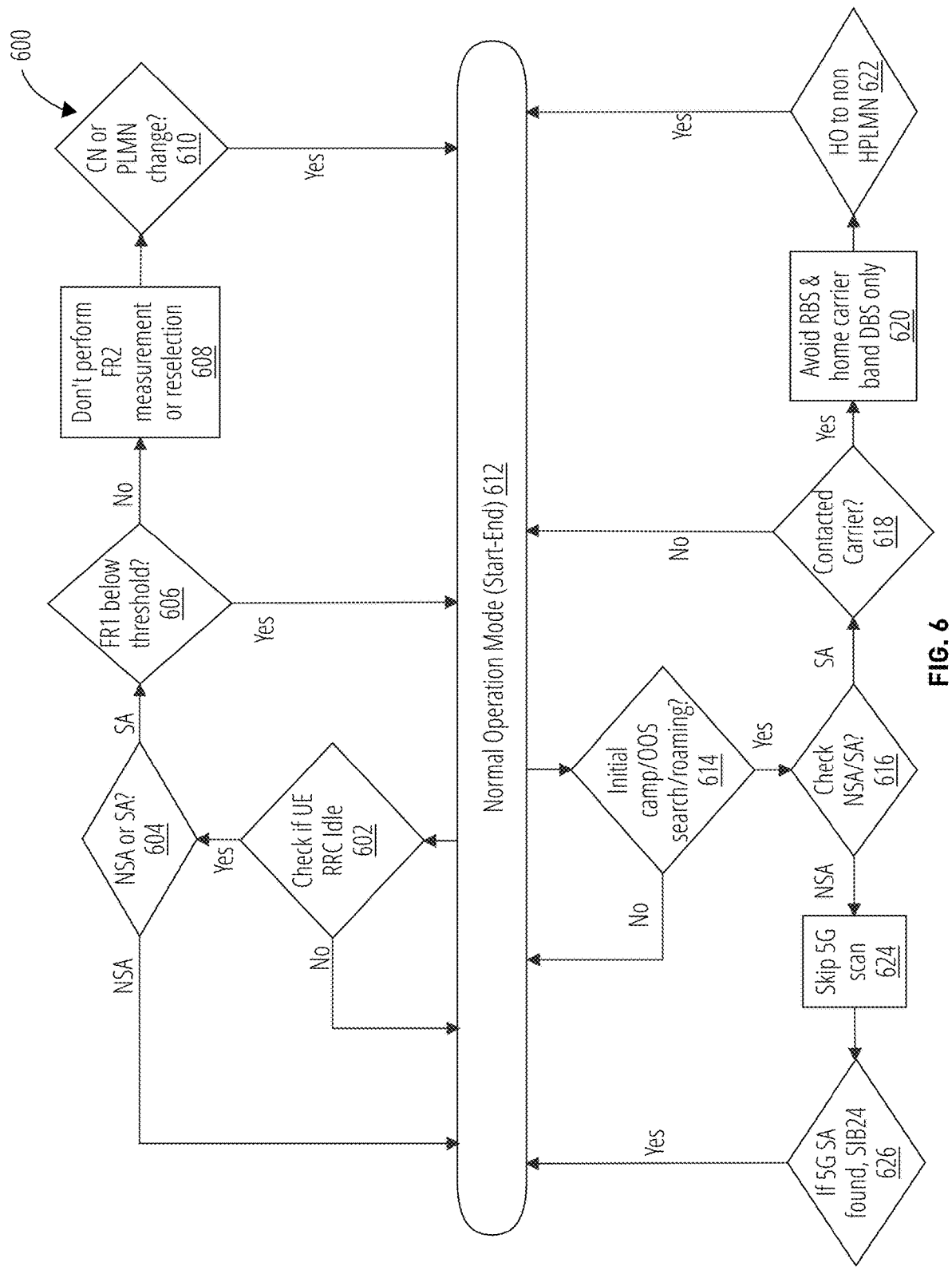
FIG. 6 illustrates a method for scanning optimization in a 5G NR multi-RAT environment in accordance with one embodiment.

FIG. 6 illustrates a flow chart of a method 600 for scanning optimization in a 5G NR multi-RAT environment according to certain embodiments. In a normal operation mode 612, a UE checks, at a decision block 602, if the UE is in RRC Idle mode. If the UE is not in RRC Idle mode, the UE returns to the normal operation mode 612. If the UE is in the RRC Idle mode, the UE determines, at a decision block 604, whether the network is configured for NSA EN-DC operation or SA dual connectivity. If the network is configured for NSA EN-DC operation, the UE returns to normal operation mode 612.

If, however, the network supports SA dual connectivity, at a decision block 606, the UE determines whether RF measurements for FR1 are below a threshold. If the RF measurements for FR1 are below the threshold, the UE returns to the normal operation mode 612. If the RF measurements for FR1 are not below the threshold, at a block 608, the UE does not perform FR2 measurement or reselection because continuing to camp on a cell using a frequency in FR1 is sufficient for certain RRC Idle mode processes, such as paging. The UE may continue to camp on the cell using the frequency in FR1 until it determines, at a decision block 610, a core network (CN) or PLMN change, in which case the UE returns to the normal operation mode 612.

At a decision block 614, the UE determines whether searching is needed (e.g., for initial search and camping, OOS search, or roaming). If searching is not needed, the UE returns to the normal operation mode 612. If searching is needed, at a decision block 616, the UE checks whether the network is configured for NSA EN-DC operation or SA dual connectivity. If the network is configured for SA dual connectivity, at a decision block 618, the UE determines whether the carrier is a contacted carrier wherein prior information is known about supported bands. If the carrier is not a contacted carrier, the UE returns to the normal operation mode 612. If the carrier is a contacted carrier, at a block 620, the UE avoids 5G RBS scanning and performs 5G DBS scans only for home carrier bands until, at a decision block 622, the UE determines a handover to a non-HPLMN. The UE then returns to the normal operation mode 612.

If, at the decision block 616, the UE determines that the network is configured for NSA EN-DC operation, at a block 624, the UE skips 5G scans (e.g., starting with 4G scans). At a decision block 626, if the UE finds a network that supports a 5G SA, the UE checks SIB24-LTE for 5G NR reselection parameters before returning to the normal operation mode 612.

Figure 7:
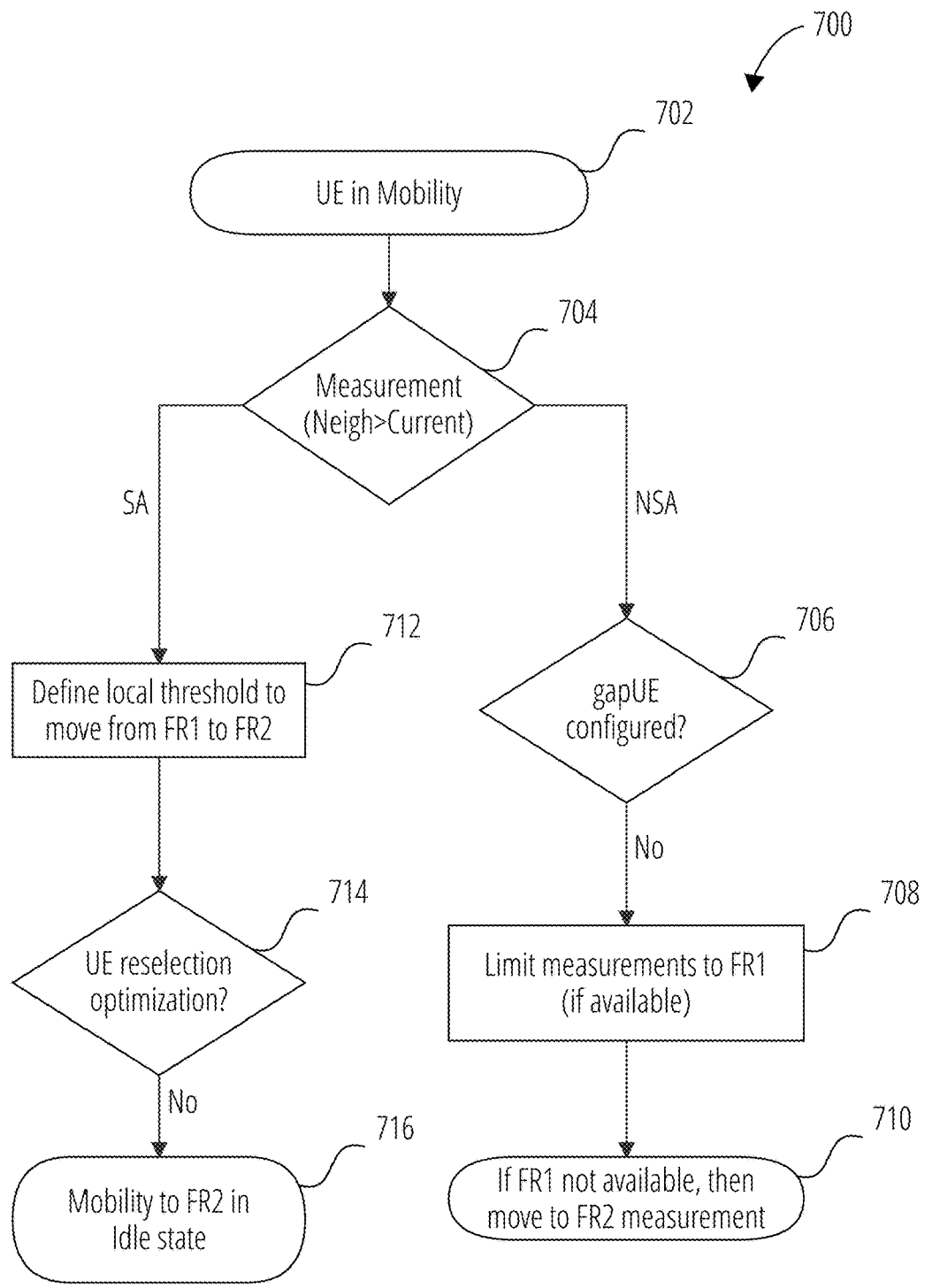
FIG. 7 illustrates a method for mobility measurements in accordance with one embodiment.

FIG. 7 is a flowchart of a method 700 for mobility measurements according to certain embodiments. At a start block 702, a UE is in a mobility mode. At a decision block 704, the UE determines that an RF measurement of a neighbor cell is better than that of a current cell. For NSA EN-DC operation in RRC connected mode, at a decision block 706, the UE determines that a gapUE information element (IE) is not configured. The gapUE IE indicates a measurement gap configuration that applies to all frequencies (FR1 and FR2). In the case of EN-DC, according to certain embodiments, the gapUE IE cannot be set up by NR RRC (i.e. only LTE RRC can configure per UE gap). If the gapUE IE is configured, then neither gapFR1 nor gapFR2 can be configured. The applicability of the measurement gap, for example, may be according to Table 9.1.2-2 in 3GPP TS 38.133. Thus, at a block 708, the UE limits measurements to FR1, if available. If FR1 is not available, at a done block 710, the UE moves to FR2 measurements.

For SA dual connectivity operation, in case carrier settings persist and the UE opts to perform reselections in 5G NR, at a block 712, a local threshold is defined for the UE to move from FR1 to FR2. At a decision block 714, the UE determines whether to perform UE reselection optimization based at least in part on the local threshold. If the UE performs UE reselection optimization, the UE does not perform reselection between FR1 and FR2 unless there is a very high priority difference between FR1 and FR2 priorities. The very high priority difference may be determined based on a predetermined priority threshold. In addition, or in other embodiments, if a current FR signal becomes below a predefined threshold and no other frequency is available on the current FR, then the UE may search the other FR for suitable cells for Idle mode reselection. For example, at the done block 716, the UE performs mobility to FR2 in the Idle state.

Figure 8:
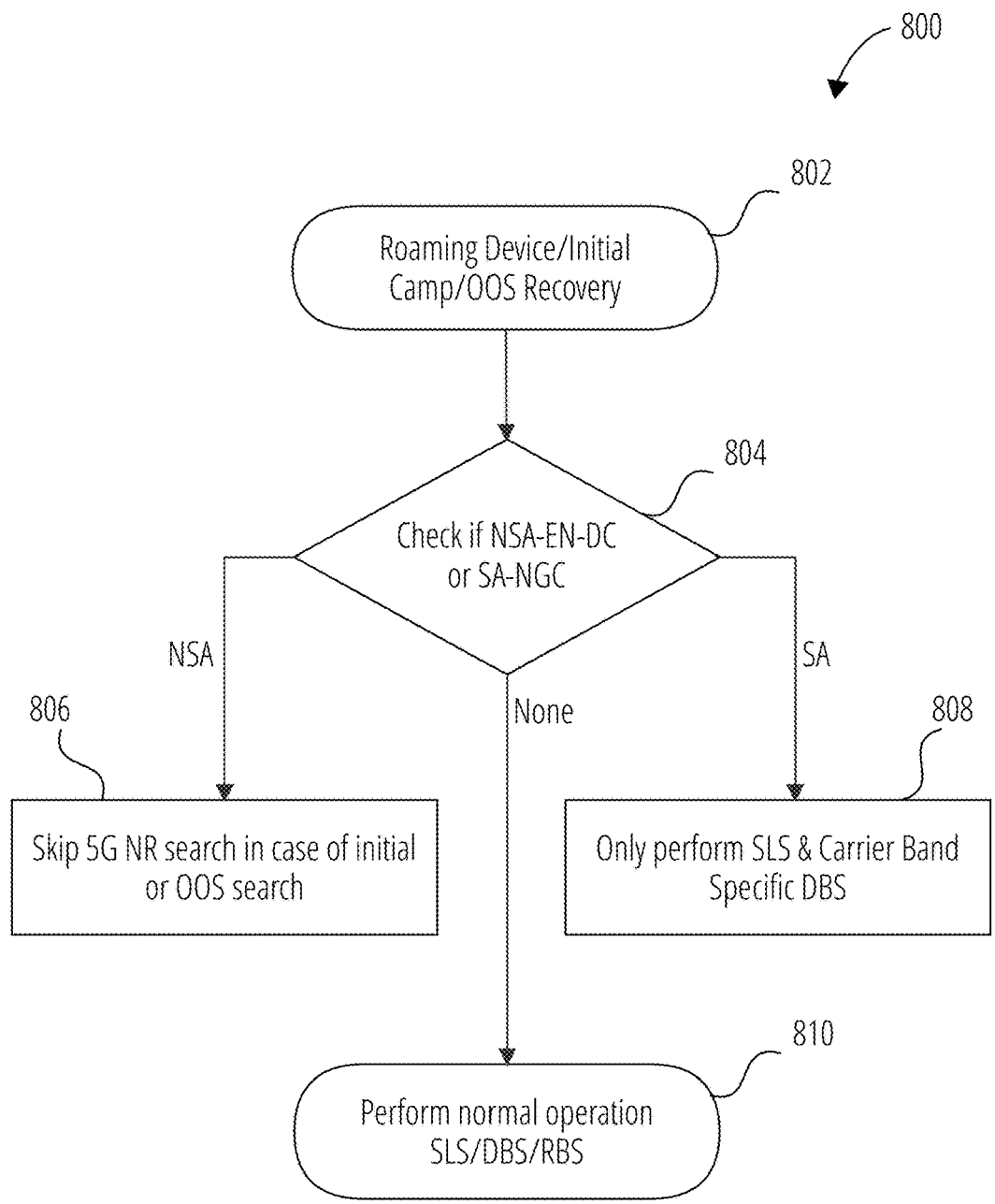
FIG. 8 illustrates a method for limiting candidate search and measurements for power optimization in a 5G NR multi-RAT environment in accordance with one embodiment.

FIG. 8 is a flowchart of a method 800 for limiting candidate search and measurements for power optimization in a 5G NR multi-RAT environment according to certain embodiments. In a block 802, a UE is in a state to perform searching (e.g., roaming, initial search and camping, or 00S recovery). At a decision block 804, the UE checks to determine whether the network supports NSA EN-DC operation or SA-NGC dual connectivity operation. If the network supports NSA EN-DC operation, at a block 806, the UE skips 5G NR searching in case of initial or 00S search. For example, the UE may start with 4G SLS scans followed by, if necessary, 3G and/or 2G SLS scans. Then, if necessary, the UE may proceed with 4G, 3G, and/or 2G DBS scans, which may be followed by 4G, 3G, and/or 2G RBS scans.

If the network supports SA-NGC dual connectivity operation, at a block 808, the UE only performs SLS scans and carrier band specific 5G DBS scans. For example, the UE may start with 5G SLS scans followed by, if necessary, 4G, 3G, and/or 2G SLS scans. Then, if necessary, the UE may proceed with 5G DBS scans only in carrier specific bands followed by 4G, 3G, and/or 2G DBS scans. If necessary, the UE may then perform 4G, 3G, and/or 2G RBS scans (but not 5G RBS scans).

If the network supports neither NSA EN-DC operation nor SA-NGC dual connectivity operation, at a block 810, the UE performs normal operations. For example, the UE may perform SLS, DBS, and/or RBS scans on available frequencies and bands.

Figure 9:
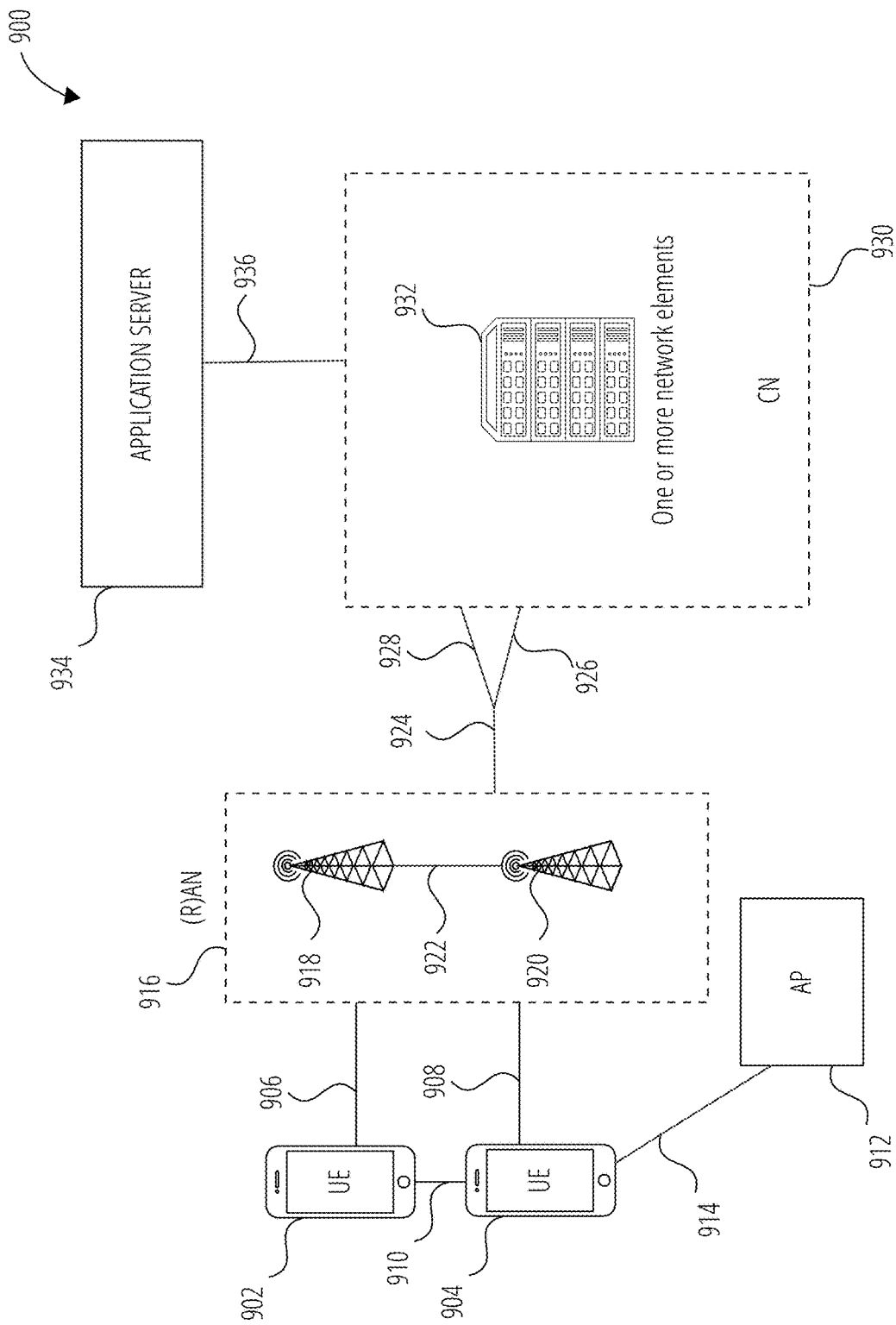
FIG. 9 illustrates a system in accordance with one embodiment.

FIG. 9 illustrates an example architecture of a system 900 of a network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 902 and UE 904. In this example, the UE 902 and the UE 904 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 902 and/or the UE 904 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 902 and UE 904 may be configured to connect, for example, communicatively couple, with an access node or radio access node (shown as (R)AN 916). In embodiments, the (R)AN 916 may be an NG RAN or a SG RAN, an E-UTRAN, or a legacy RAN, such as a UTRAN or GERAN. As used herein, the term "NG RAN" or the like may refer to a (R)AN 916 that operates in an NR or SG system, and the term "E-UTRAN" or the like may refer to a (R)AN 916 that operates in an LTE or 4G system. The UE 902 and UE 904 utilize connections (or channels) (shown as connection 906 and connection 908, respectively), each of which comprises a physical communications interface or layer (discussed in further detail below).

In this example, the connection 906 and connection 908 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 902 and UE 904 may directly exchange communication data via a ProSe interface 910. The ProSe interface 910 may alternatively be referred to as a sidelink (SL) interface 110 and may comprise one or more logical channels, including but not limited to a PSCCH, a PSSCH, a PSDCH, and a PSBCH.

The UE 904 is shown to be configured to access an AP 912 (also referred to as "WLAN node," "WLAN," "WLAN Termination," "WT" or the like) via connection 914. The connection 914 can comprise a local wireless connection, such as a connection consistent with any IEEE 802.11 protocol, wherein the AP 912 would comprise a wireless fidelity (Wi-Fi®) router. In this example, the AP 912 may be connected to the Internet without connecting to the core network of the wireless system (described in further detail below). In various embodiments, the UE 904, (R)AN 916, and AP 912 may be configured to utilize LWA operation and/or LWIP operation. The LWA operation may involve the UE 904 in RRC_CONNECTED being configured by the RAN node 918 or the RAN node 920 to utilize radio resources of LTE and WLAN. LWIP operation may involve the UE 904 using WLAN radio resources (e.g., connection 914) via IPsec protocol tunneling to authenticate and encrypt packets (e.g., IP packets) sent over the connection 914. IPsec tunneling may include encapsulating the entirety of original IP packets and adding a new packet header, thereby protecting the original header of the IP packets.

The (R)AN 916 can include one or more AN nodes, such as RAN node 918 and RAN node 920, that enable the connection 906 and connection 908. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 900 (e.g., an eNB). According to various embodiments, the RAN node 918 or RAN node 920 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 918 or RAN node 920 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 918 or RAN node 920); a MAC/PHY split wherein RRC, PDCP, RLC, and MAC layers are operated by the CRAN/vBBUP and the PHY layer is operated by individual RAN nodes (e.g., RAN node 918 or RAN node 920); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 918 or RAN node 920 to perform other virtualized applications. In some implementations, an individual RAN node may represent individual gNB-DUs that are connected to a gNB-CU via individual F1 interfaces (not shown by FIG. 9). In these implementations, the gNB-DUs may include one or more remote radio heads or RFEMs, and the gNB-CU may be operated by a server that is located in the (R)AN 916 (not shown) or by a server pool in a similar manner as the CRAN/vBBUP. Additionally, or alternatively, one or more of the RAN node 918 or RAN node 920 may be next generation eNBs (ng-eNBs), which are RAN nodes that provide E-UTRA user plane and control plane protocol terminations toward the UE 902 and UE 904, and are connected to an SGC via an NG interface (discussed infra). In V2X scenarios one or more of the RAN node 918 or RAN node 920 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 918 and/or the RAN node 920 can terminate the air interface protocol and can be the first point of contact for the UE 902 and UE 904. In some embodiments, the RAN node 918 and/or the RAN node 920 can fulfill various logical functions for the (R)AN 916 including, but not limited to, radio network controller (RNC) functions such as radio bearer management, uplink and downlink dynamic radio resource management and data packet scheduling, and mobility management.

In embodiments, the UE 902 and UE 904 can be configured to communicate using OFDM communication signals with each other or with the RAN node 918 and/or the RAN node 920 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 918 and/or the RAN node 920 to the UE 902 and UE 904, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 902 and UE 904 and the RAN node 918 and/or the RAN node 920 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 902 and UE 904 and the RAN node 918 or RAN node 920 may operate using LAA, eLAA, and/or feLAA mechanisms. In these implementations, the UE 902 and UE 904 and the RAN node 918 or RAN node 920 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 902 and UE 904, RAN node 918 or RAN node 920, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 902, AP 912, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 902 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 902 and UE 904. The PDCCH carries information about the transport format and resource allocations related to the PDSCH channel, among other things. It may also inform the UE 902 and UE 904 about the transport format, resource allocation, and HARQ information related to the uplink shared channel. Typically, downlink scheduling (assigning control and shared channel resource blocks to the UE 904 within a cell) may be performed at any of the RAN node 918 or RAN node 920 based on channel quality information fed back from any of the UE 902 and UE 904. The downlink resource assignment information may be sent on the PDCCH used for (e.g., assigned to) each of the UE 902 and UE 904.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 918 or RAN node 920 may be configured to communicate with one another via interface 922. In embodiments where the system 900 is an LTE system (e.g., when CN 930 is an EPC), the interface 922 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 902 from an SeNB for user data; information of PDCP PDUs that were not delivered to a UE 902; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 900 is a 5G or NR system (e.g., when CN 930 is an 5GC), the interface 922 may be an Xn interface. The Xn interface is defined between two or more RAN nodes (e.g., two or more gNBs and the like) that connect to 5GC, between a RAN node 918 (e.g., a gNB) connecting to 5GC and an eNB, and/or between two eNBs connecting to 5GC (e.g., CN 930). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 902 in a connected mode (e.g., CM-CONNECTED) including functionality to manage the UE mobility for connected mode between one or more RAN node 918 or RAN node 920. The mobility support may include context transfer from an old (source) serving RAN node 918 to new (target) serving RAN node 920; and control of user plane tunnels between old (source) serving RAN node 918 to new (target) serving RAN node 920. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 916 is shown to be communicatively coupled to a core network-in this embodiment, CN 930. The CN 930 may comprise one or more network elements 932, which are configured to offer various data and telecommunications services to customers/subscribers (e.g., users of UE 902 and UE 904) who are connected to the CN 930 via the (R)AN 916. The components of the CN 930 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 930 may be referred to as a network slice, and a logical instantiation of a portion of the CN 930 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 934 may be an element offering applications that use IP bearer resources with the core network (e.g., UMTS PS domain, LTE PS data services, etc.). The application server 934 can also be configured to support one or more communication services (e.g., VoIP sessions, PTT sessions, group communication sessions, social networking services, etc.) for the UE 902 and UE 904 via the EPC. The application server 934 may communicate with the CN 930 through an IP communications interface 936.

In embodiments, the CN 930 may be an SGC, and the (R)AN 116 may be connected with the CN 930 via an NG interface 924. In embodiments, the NG interface 924 may be split into two parts, an NG user plane (NG-U) interface 926, which carries traffic data between the RAN node 918 or RAN node 920 and a UPF, and the S1 control plane (NG-C) interface 928, which is a signaling interface between the RAN node 918 or RAN node 920 and AMFs.

In embodiments, the CN 930 may be a SG CN, while in other embodiments, the CN 930 may be an EPC). Where CN 930 is an EPC, the (R)AN 116 may be connected with the CN 930 via an S1 interface 924. In embodiments, the S1 interface 924 may be split into two parts, an S1 user plane (S1-U) interface 926, which carries traffic data between the RAN node 918 or RAN node 920 and the S-GW, and the S1-MME interface 928, which is a signaling interface between the RAN node 918 or RAN node 920 and MMEs.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 10:
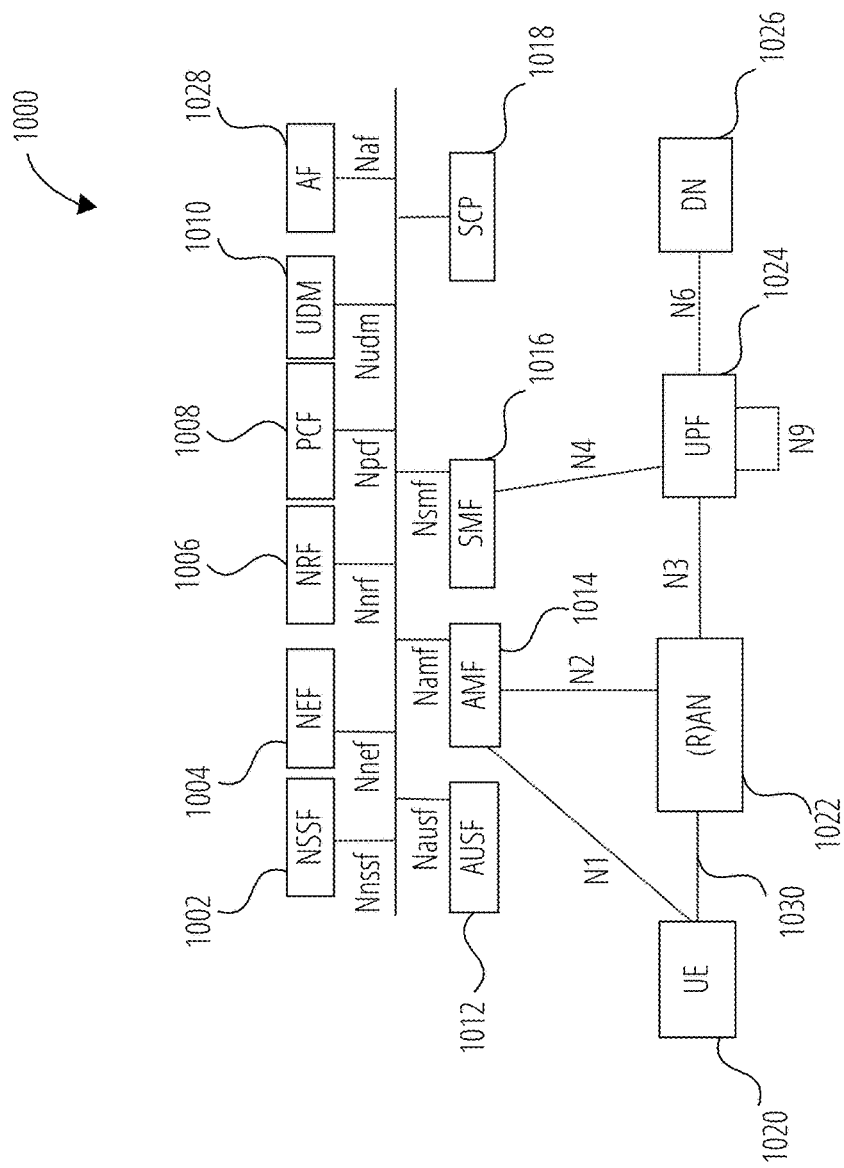
FIG. 10 illustrates an example service based architecture in accordance with certain embodiments.

FIG. 10 illustrates a service based architecture 1000 in 5GS according to one embodiment. As described in 3GPP TS 23.501, the service based architecture 1000 comprises NFs such as an NSSF 1002, a NEF 1004, an NRF 1006, a PCF 1008, a UDM 1010, an AUSF 1012, an AMF 1014, an SMF 1016, for communication with a UE 1020, a (R)AN 1022, a UPF 1024, and a DN 1026. The NFs and NF services can communicate directly, referred to as Direct Communication, or indirectly via a SCP 1018, referred to as Indirect Communication. FIG. 10 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 10 are described below.

The NSSF 1002 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1004 supports exposure of capabilities and events. NF capabilities and events may be securely exposed by the NEF 1004 (e.g., for 3rd party, Application Functions, and/or Edge Computing). The NEF 1004 may store/retrieve information as structured data using a standardized interface (Nudr) to a UDR. The NEF 1004 may also secure provision of information from an external application to 3GPP network and may provide for the Application Functions to securely provide information to the 3GPP network (e.g., expected UE behavior, 5GLAN group information, and service specific information), wherein the NEF 1004 may authenticate and authorize and assist in throttling the Application Functions. The NEF 1004 may provide translation of internal-external information by translating between information exchanged with the AF and information exchanged with the internal network function. For example, the NEF 1004 translates between an AF-Service-Identifier and internal 5G Core information such as DNN and S-NSSAI. The NEF 1004 may handle masking of network and user sensitive information to external AF's according to the network policy. The NEF 1004 may receive information from other network functions (based on exposed capabilities of other network functions), and stores the received information as structured data using a standardized interface to a UDR. The stored information can be accessed and re-exposed by the NEF 1004 to other network functions and Application Functions, and used for other purposes such as analytics. For external exposure of services related to specific UE(s), the NEF 1004 may reside in the HPLMN. Depending on operator agreements, the NEF 1004 in the HPLMN may have interface(s) with NF(s) in the VPLMN. When a UE is capable of switching between EPC and 5GC, an SCEF+NEF may be used for service exposure.

The NRF 1006 supports service discovery function by receiving an NF Discovery Request from an NF instance or SCP and providing the information of the discovered NF instances to the NF instance or SCP. The NRF 1006 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1008 supports a unified policy framework to govern network behavior. The PCF 1008 provides policy rules to Control Plane function(s) to enforce them. The PCF 1008 accesses subscription information relevant for policy decisions in a Unified Data Repository (UDR). The PCF 1008 may access the UDR located in the same PLMN as the PCF.

The UDM 1010 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1010 uses subscription data (including authentication data) that may be stored in a UDR, in which case a UDM implements the application logic and may not require an internal user data storage and several different UDMs may serve the same user in different transactions. The UDM 1010 may be located in the HPLMN of the subscribers it serves, and may access the information of the UDR located in the same PLMN.

The AUSF 1012 supports authentication for 3GPP access and untrusted non-3GPP access. The AUSF 1012 may also provide support for Network Slice-Specific Authentication and Authorization.

The AMF 1014 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1014. Regardless of the number of Network functions, in certain embodiments there is only one NAS interface instance per access network between the UE and the CN, terminated at one of the Network functions that implements at least NAS security and Mobility Management. The AMF 1014 may also include policy related functionalities.

In addition to the functionalities described above, the AMF 1014 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1016 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1016 may include policy related functionalities.

The SCP 1018 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1018 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1020 may include a device with radio communication capabilities. For example, the UE 1020 may comprise a smartphone (e.g., handheld touchscreen mobile computing devices connectable to one or more cellular networks). The UE 1020 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1020 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1020 may be configured to connect or communicatively couple with the (R)AN 1022 through a radio interface 1030, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1020 and the (R)AN 1022 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 1022 to the UE 1020 and a UL transmission may be from the UE 1020 to the (R)AN 1022. The UE 1020 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1022 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1022 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1022) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1020 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1024 may act as an anchor point for intra-RAT and inter-RAT mobility, an external PDU session point of interconnect to the DN 1026, and a branching point to support multi-homed PDU session. The UPF 1024 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1024 may include an uplink classifier to support routing traffic flows to a data network. The DN 1026 may represent various network operator services, Internet access, or third party services. The DN 1026 may include, for example, an application server.

Multi-Radio Dual Connectivity (MR-DC) is a generalization of Intra-E-UTRA Dual Connectivity (DC), where a multiple receive (Rx)/transmit (Tx) capable UE may be configured to utilize resources provided by two different nodes connected via non-ideal backhaul, one providing NR access and the other one providing either E-UTRA or NR access. One node may act as a Master Node (MN) and the other may act as a Secondary Node (SN). The MN and SN may be connected via a network interface, and at least the MN is connected to the core network. The MN and/or the SN may be operated with shared spectrum channel access.

In certain embodiments, functions specified for a UE may be used for an Integrated Access and Backhaul-Mobile Termination (IAB-MT) unless otherwise stated. Similar to UE, the IAB-MT can access the network using either one network node or using two different nodes with E-UTRA-NR Dual Connectivity (EN-DC) and NR-NR Dual Connectivity (NR-DC) architectures. In EN-DC, the backhauling traffic over the E-UTRA radio interface may not be supported. MR-DC may be designed based on the assumption of non-ideal backhaul between the different nodes but can also be used in case of ideal backhaul.

Figure 11:
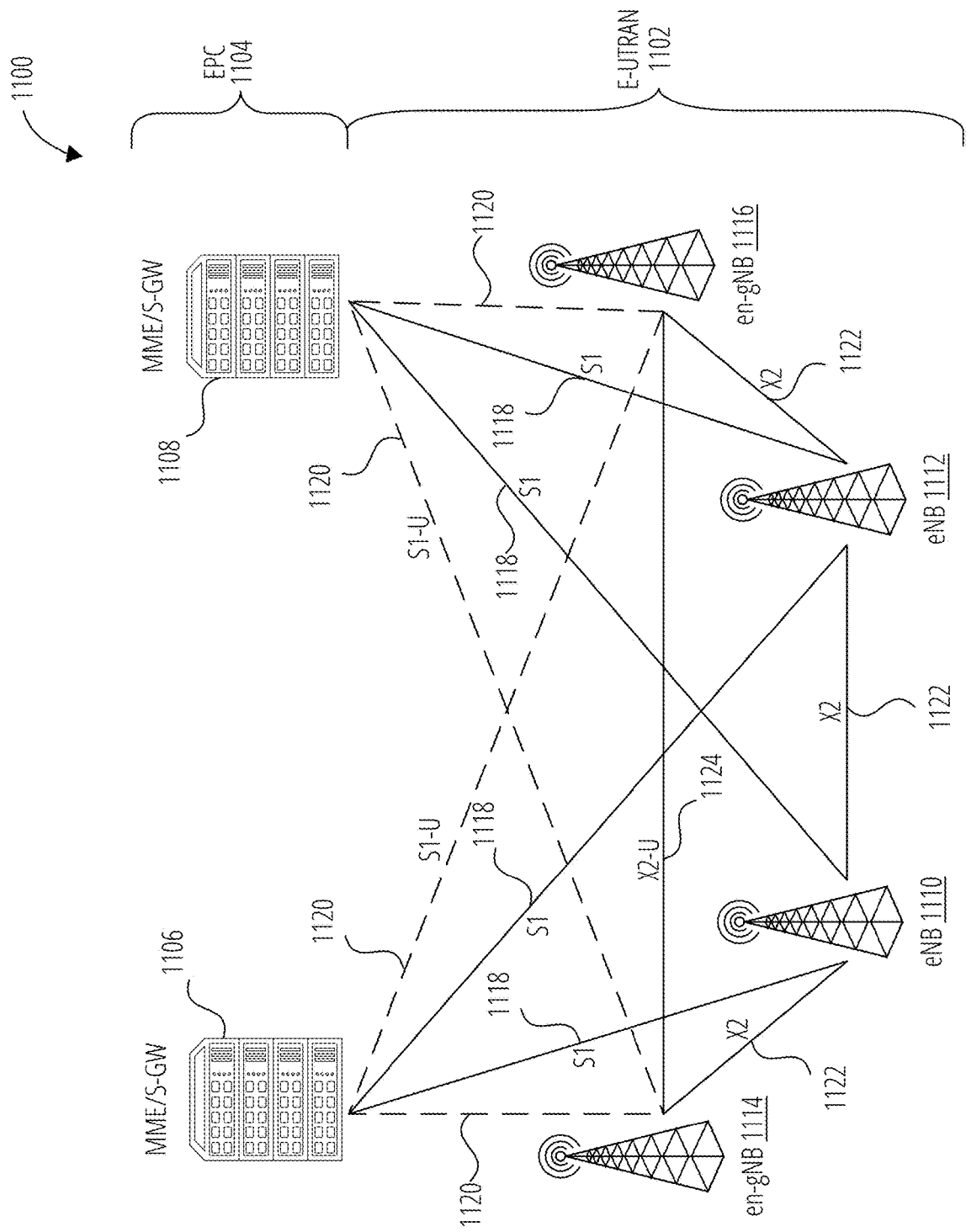
FIG. 11 illustrates an EN-DC architecture according to embodiments herein.

FIG. 11 illustrates an EN-DC architecture 1100 according to embodiments herein. The EN-DC architecture 1100 includes an E-UTRAN 1102 and an EPC 1104. The E-UTRAN 1102 supports MR-DC via EN-DC, in which a UE is connected to one eNB that acts as a MN and one en-gNB that acts as a SN. An en-gNB may be a node that provides NR user plane and control plane protocol terminations towards the UE, and may act as a SN in EN-DC. In FIG. 11, the EPC 1104 may comprise one or more Mobility Management Entity/Serving Gateways (MME/S-GWs), such as an MME/S-GW 1106 and an MME/S-GW 1108. By way of example, the E-UTRAN 1102 may comprise an eNB 1110, an eNB 1112, an en-gNB 1114, and an en-gNB 1116. Each of the eNB 1110 and the eNB 1112 may be connected to the EPC 1104 via one or more S1 interfaces 1118 and to one or more en-gNBs via one or more X2 interfaces 1122. Each of the en-gNB 1114 and the en-gNB 1116 may be connected to the EPC 1104 via one or more S1-U interfaces 1120. The en-gNB 1114 and the en-gNB 1116 may be connected to one another through an X2-U interface 1124.

In certain implementations, NG-RAN supports NG-RAN E-UTRA-NR Dual Connectivity (NGEN-DC), in which a UE is connected to one ng-eNB that acts as a MN and one gNB that acts as a SN.

In certain implementations, NG-RAN supports NR-E-UTRA Dual Connectivity (NE-DC), in which a UE is connected to one gNB that acts as a MN and one ng-eNB that acts as a SN.

In certain implementations, NG-RAN supports NR-NR Dual Connectivity (NR-DC), in which a UE is connected to one gNB that acts as a MN and another gNB that acts as a SN. In addition, NR-DC can also be used when a UE is connected to two gNB-DUs, one serving the MCG and the other serving the SCG, connected to the same gNB-CU, acting both as a MN and as a SN.

Figure 12:
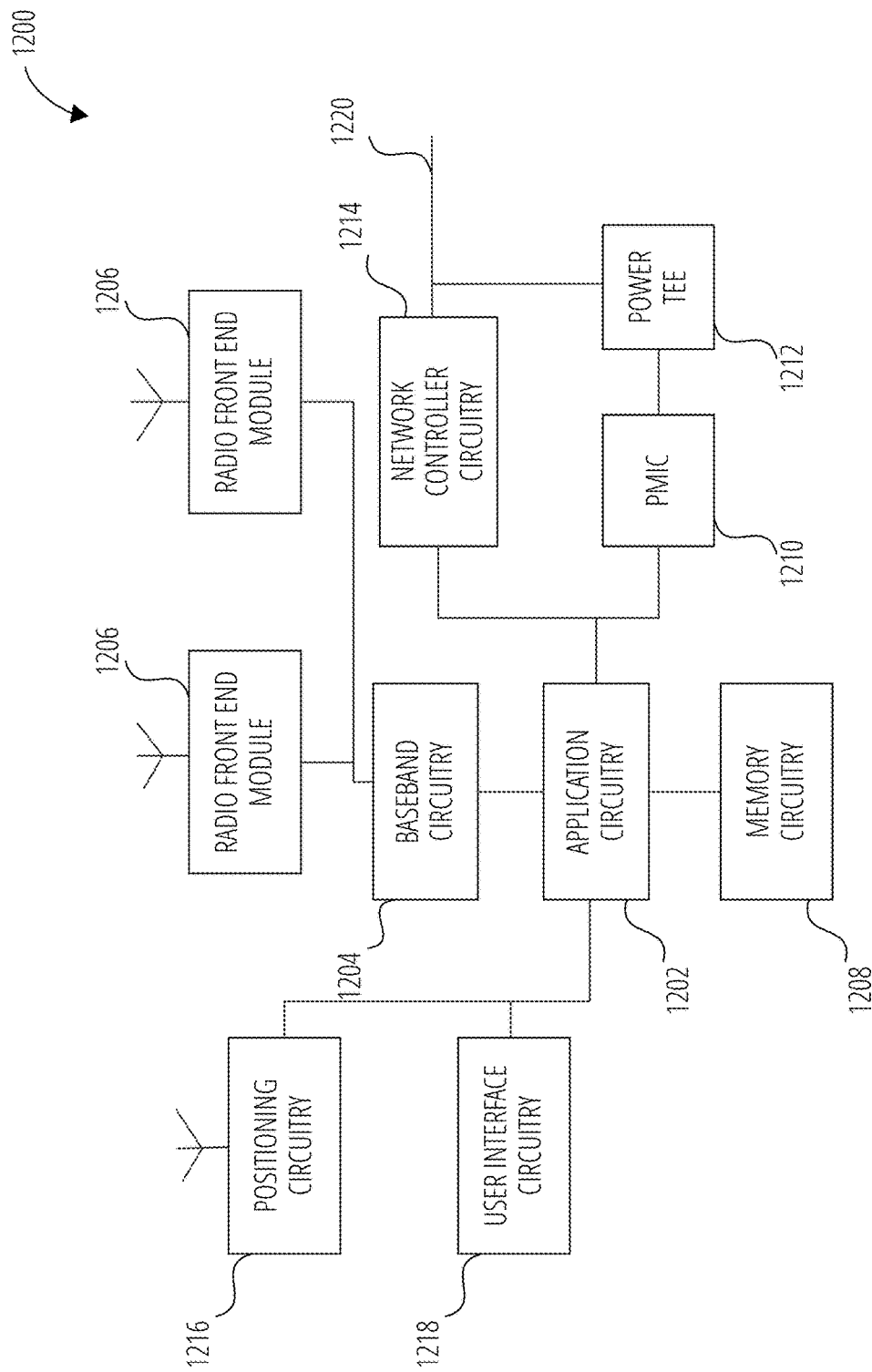
FIG. 12 illustrates an infrastructure equipment in accordance with one embodiment.

FIG. 12 illustrates an example of infrastructure equipment 1200 in accordance with various embodiments. The infrastructure equipment 1200 may be implemented as a base station, radio head, RAN node, AN, application server, and/or any other element/device discussed herein. In other examples, the infrastructure equipment 1200 could be implemented in or by a UE.

The infrastructure equipment 1200 includes application circuitry 1202, baseband circuitry 1204, one or more radio front end module 1206 (RFEM), memory circuitry 1208, power management integrated circuitry (shown as PMIC 1210), power tee circuitry 1212, network controller circuitry 1214, network interface connector 1220, satellite positioning circuitry 1216, and user interface circuitry 1218. In some embodiments, the device infrastructure equipment 1200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1202 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1202 may be coupled with or may include memory/storage elements and may be configured to execute instructions stored in the memory/storage to enable various applications or operating systems to run on the infrastructure equipment 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1202 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1202 may comprise, or may be, a special-purpose processor/controller to operate according to the various embodiments herein. As examples, the processor(s) of application circuitry 1202 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1200 may not utilize application circuitry 1202, and instead may include a special-purpose processor/controller to process IP data received from an EPC or 5GC, for example.

In some implementations, the application circuitry 1202 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1202 may comprise logic blocks or logic fabric, and other interconnected resources that may be programmed to perform various functions, such as the procedures, methods, functions, etc. of the various embodiments discussed herein. In such embodiments, the circuitry of application circuitry 1202 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1204 may be implemented, for example, as a solder-down substrate including one or more integrated circuits, a single packaged integrated circuit soldered to a main circuit board or a multi-chip module containing two or more integrated circuits.

The user interface circuitry 1218 may include one or more user interfaces designed to enable user interaction with the infrastructure equipment 1200 or peripheral component interfaces designed to enable peripheral component interaction with the infrastructure equipment 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1206 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1206, which incorporates both mmWave antennas and sub-mmWave.

The memory circuitry 1208 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1208 may be implemented as one or more of solder down packaged integrated circuits, socketed memory modules and plug-in memory cards.

The PMIC 1210 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1212 may provide for electrical power drawn from a network cable to provide both power supply and data connectivity to the infrastructure equipment 1200 using a single cable.

The network controller circuitry 1214 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1200 via network interface connector 1220 using a physical connection, which may be electrical (commonly referred to as a "copper interconnect"), optical, or wireless. The network controller circuitry 1214 may include one or more dedicated processors and/or FPGAs to communicate using one or more of the aforementioned protocols. In some implementations, the network controller circuitry 1214 may include multiple controllers to provide connectivity to other networks using the same or different protocols.

The positioning circuitry 1216 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1216 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1216 may include a Micro-Technology for Positioning, Navigation, and Timing (Micro-PNT) IC that uses a master timing clock to perform position tracking/estimation without GNSS assistance. The positioning circuitry 1216 may also be part of, or interact with, the baseband circuitry 1204 and/or radio front end module 1206 to communicate with the nodes and components of the positioning network. The positioning circuitry 1216 may also provide position data and/or time data to the application circuitry 1202, which may use the data to synchronize operations with various infrastructure, or the like. The components shown by FIG. 12 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 13:
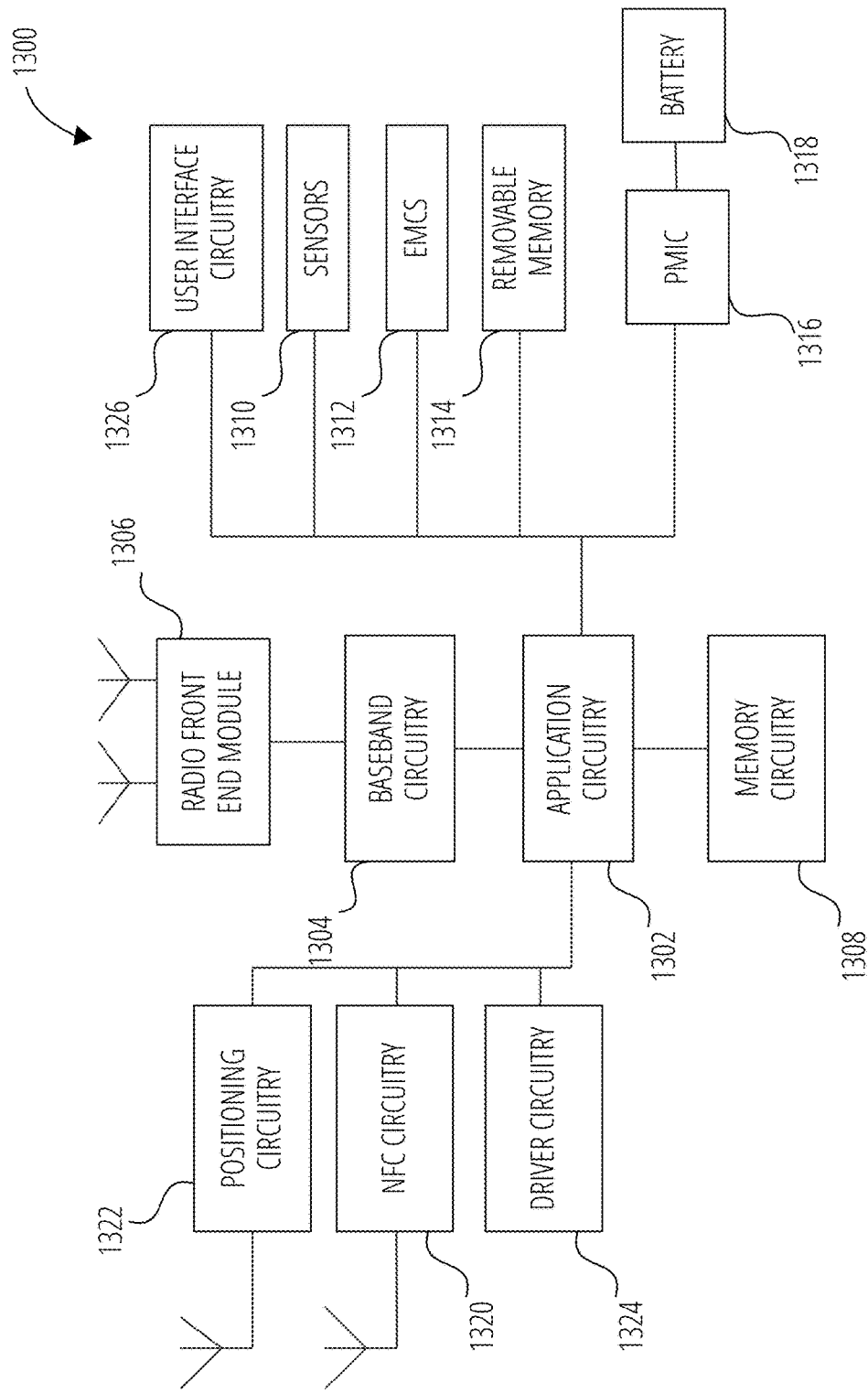
FIG. 13 illustrates a platform in accordance with one embodiment.

FIG. 13 illustrates an example of a platform 1300 in accordance with various embodiments. In embodiments, the computer platform 1300 may be suitable for use as UEs, application servers, and/or any other element/device discussed herein. The platform 1300 may include any combinations of the components shown in the example. The components of platform 1300 may be implemented as integrated circuits (ICs), portions thereof, discrete electronic devices, or other modules, logic, hardware, software, firmware, or a combination thereof adapted in the computer platform 1300, or as components otherwise incorporated within a chassis of a larger system. The block diagram of FIG. 13 is intended to show a high level view of components of the computer platform 1300. However, some of the components shown may be omitted, additional components may be present, and different arrangement of the components shown may occur in other implementations.

Application circuitry 1302 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose 10, memory card controllers such as SD MMC or similar, USB interfaces, MIPI interfaces, and JTAG test access ports. The processors (or cores) of the application circuitry 1302 may be coupled with or may include memory/storage elements and may be configured to execute instructions stored in the memory/storage to enable various applications or operating systems to run on the platform 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1302 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1302 may comprise, or may be, a special-purpose processor/controller to operate according to the various embodiments herein.

As examples, the processor(s) of application circuitry 1302 may include an Intel® Architecture Core™ based processor, such as a Quark™, an Atom™, an i3, an i5, an i7, or an MCU-class processor, or another such processor available from Intel® Corporation. The processors of the application circuitry 1302 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1302 may be a part of a system on a chip (SoC) in which the application circuitry 1302 and other components are formed into a single integrated circuit, or a single package, such as the Edison™ or Galileo™ SoC boards from Intel® Corporation.

Additionally or alternatively, application circuitry 1302 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1302 may comprise logic blocks or logic fabric, and other interconnected resources that may be programmed to perform various functions, such as the procedures, methods, functions, etc. of the various embodiments discussed herein. In such embodiments, the circuitry of application circuitry 1302 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1304 may be implemented, for example, as a solder-down substrate including one or more integrated circuits, a single packaged integrated circuit soldered to a main circuit board or a multi-chip module containing two or more integrated circuits.

The radio front end module 1306 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1306, which incorporates both mmWave antennas and sub-mmWave.

The memory circuitry 1308 may include any number and type of memory devices used to provide for a given amount of system memory. As examples, the memory circuitry 1308 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1308 may be developed in accordance with a Joint Electron Devices Engineering Council (JEDEC) low power double data rate (LPDDR)-based design, such as LPDDR2, LPDDR3, LPDDR4, or the like. Memory circuitry 1308 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1308 maybe on-die memory or registers associated with the application circuitry 1302. To provide for persistent storage of information such as data, applications, operating systems and so forth, memory circuitry 1308 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1300 may incorporate the three-dimensional (3D) cross-point (XPOINT) memories from Intel® and Micron®.

The removable memory 1314 may include devices, circuitry, enclosures/housings, ports or receptacles, etc. used to couple portable data storage devices with the platform 1300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1300 may also include interface circuitry (not shown) that is used to connect external devices with the platform 1300. The external devices connected to the platform 1300 via the interface circuitry include sensors 1310 and electro-mechanical components (shown as EMCs 1312), as well as removable memory devices coupled to removable memory 1314.

The sensors 1310 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1312 include devices, modules, or subsystems whose purpose is to enable platform 1300 to change its state, position, and/or orientation, or move or control a mechanism or (sub)system. Additionally, EMCs 1312 may be configured to generate and send messages/signaling to other components of the platform 1300 to indicate a current state of the EMCs 1312. Examples of the EMCs 1312 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1300 is configured to operate one or more EMCs 1312 based on one or more captured events and/or instructions or control signals received from a service provider and/or various clients. In some implementations, the interface circuitry may connect the platform 1300 with positioning circuitry 1322. The positioning circuitry 1322 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1322 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1322 may include a Micro-PNT IC that uses a master timing clock to perform position tracking/estimation without GNSS assistance. The positioning circuitry 1322 may also be part of, or interact with, the baseband circuitry 1304 and/or radio front end module 1306 to communicate with the nodes and components of the positioning network. The positioning circuitry 1322 may also provide position data and/or time data to the application circuitry 1302, which may use the data to synchronize operations with various infrastructure (e.g., radio base stations), for turn-by-turn navigation applications, or the like.

In some implementations, the interface circuitry may connect the platform 1300 with Near-Field Communication circuitry (shown as NFC circuitry 1320). The NFC circuitry 1320 is configured to provide contactless, short-range communications based on radio frequency identification (RFID) standards, wherein magnetic field induction is used to enable communication between NFC circuitry 1320 and NFC-enabled devices external to the platform 1300 (e.g., an "NFC touchpoint"). NFC circuitry 1320 comprises an NFC controller coupled with an antenna element and a processor coupled with the NFC controller. The NFC controller may be a chip/IC providing NFC functionalities to the NFC circuitry 1320 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1320, or initiate data transfer between the NFC circuitry 1320 and another active NFC device (e.g., a smartphone or an NFC-enabled POS terminal) that is proximate to the platform 1300.

The driver circuitry 1324 may include software and hardware elements that operate to control particular devices that are embedded in the platform 1300, attached to the platform 1300, or otherwise communicatively coupled with the platform 1300. The driver circuitry 1324 may include individual drivers allowing other components of the platform 1300 to interact with or control various input/output (I/O) devices that may be present within, or connected to, the platform 1300. For example, driver circuitry 1324 may include a display driver to control and allow access to a display device, a touchscreen driver to control and allow access to a touchscreen interface of the platform 1300, sensor drivers to obtain sensor readings of sensors 1310 and control and allow access to sensors 1310, EMC drivers to obtain actuator positions of the EMCs 1312 and/or control and allow access to the EMCs 1312, a camera driver to control and allow access to an embedded image capture device, audio drivers to control and allow access to one or more audio devices.

The power management integrated circuitry (shown as PMIC 1316) (also referred to as "power management circuitry") may manage power provided to various components of the platform 1300. In particular, with respect to the baseband circuitry 1304, the PMIC 1316 may control power-source selection, voltage scaling, battery charging, or DC-to-DC conversion. The PMIC 1316 may often be included when the platform 1300 is capable of being powered by a battery 1318, for example, when the device is included in a UE.

In some embodiments, the PMIC 1316 may control, or otherwise be part of, various power saving mechanisms of the platform 1300. For example, if the platform 1300 is in an RRC_Connected state, where it is still connected to the RAN node as it expects to receive traffic shortly, then it may enter a state known as Discontinuous Reception Mode (DRX) after a period of inactivity. During this state, the platform 1300 may power down for brief intervals of time and thus save power. If there is no data traffic activity for an extended period of time, then the platform 1300 may transition off to an RRC_Idle state, where it disconnects from the network and does not perform operations such as channel quality feedback, handover, etc. The platform 1300 goes into a very low power state and it performs paging where again it periodically wakes up to listen to the network and then powers down again. The platform 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1318 may power the platform 1300, although in some examples the platform 1300 may be mounted deployed in a fixed location, and may have a power supply coupled to an electrical grid. The battery 1318 may be a lithium ion battery, a metal-air battery, such as a zinc-air battery, an aluminum-air battery, a lithium-air battery, and the like. In some implementations, such as in V2X applications, the battery 1318 may be a typical lead-acid automotive battery.

In some implementations, the battery 1318 may be a "smart battery," which includes or is coupled with a Battery Management System (BMS) or battery monitoring integrated circuitry. The BMS may be included in the platform 1300 to track the state of charge (SoCh) of the battery 1318. The BMS may be used to monitor other parameters of the battery 1318 to provide failure predictions, such as the state of health (SoH) and the state of function (SoF) of the battery 1318. The BMS may communicate the information of the battery 1318 to the application circuitry 1302 or other components of the platform 1300. The BMS may also include an analog-to-digital (ADC) convertor that allows the application circuitry 1302 to directly monitor the voltage of the battery 1318 or the current flow from the battery 1318. The battery parameters may be used to determine actions that the platform 1300 may perform, such as transmission frequency, network operation, sensing frequency, and the like.

A power block, or other power supply coupled to an electrical grid may be coupled with the BMS to charge the battery 1318. In some examples, the power block may be replaced with a wireless power receiver to obtain the power wirelessly, for example, through a loop antenna in the computer platform 1300. In these examples, a wireless battery charging circuit may be included in the BMS. The specific charging circuits chosen may depend on the size of the battery 1318, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1326 includes various input/output (I/O) devices present within, or connected to, the platform 1300, and includes one or more user interfaces designed to enable user interaction with the platform 1300 and/or peripheral component interfaces designed to enable peripheral component interaction with the platform 1300. The user interface circuitry 1326 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1300. The output device circuitry may also include speakers or other audio emitting devices, printer(s), and/or the like. In some embodiments, the sensors 1310 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1300 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 14:
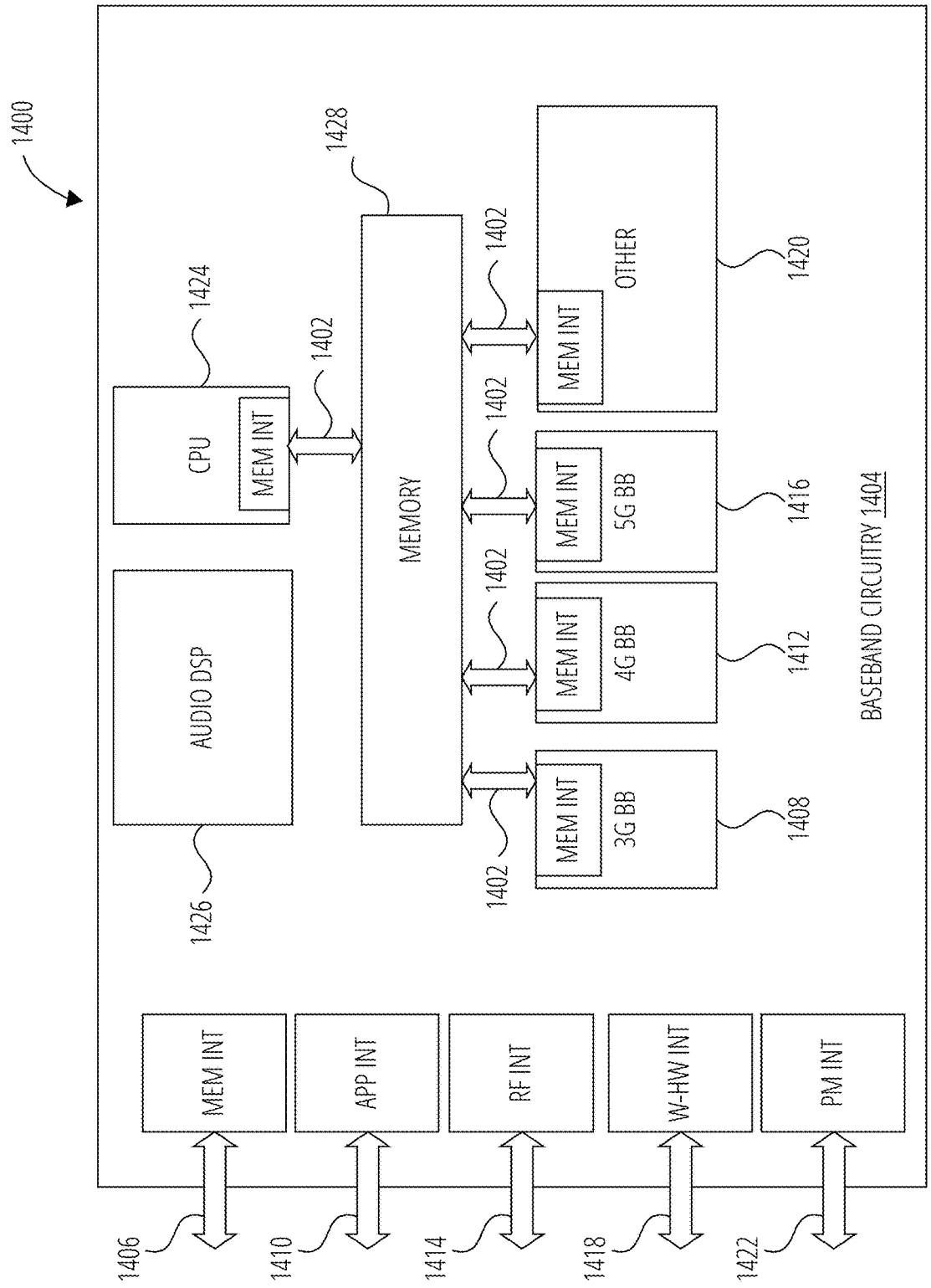
FIG. 14 illustrates example interfaces in accordance with one embodiment.

FIG. 14 illustrates example interfaces 1400 of baseband circuitry in accordance with some embodiments. As discussed above, the baseband circuitry 1404 of FIG. 14 may comprise 3G baseband processor 1408, 4G baseband processor 1412, 5G baseband processor 1416, other baseband processor(s) 1420, CPU 1424, and a memory 1428 utilized by said processors. As illustrated, each of the processors may include a respective memory interface 1402 to send/receive data to/from the memory 1428.

The baseband circuitry 1404 may further include one or more interfaces to communicatively couple to other circuitries/devices, such as a memory interface 1406 (e.g., an interface to send/receive data to/from memory external to the baseband circuitry 1404), an application circuitry interface 1410, an RF circuitry interface 1414, a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1422.

Figure 15:
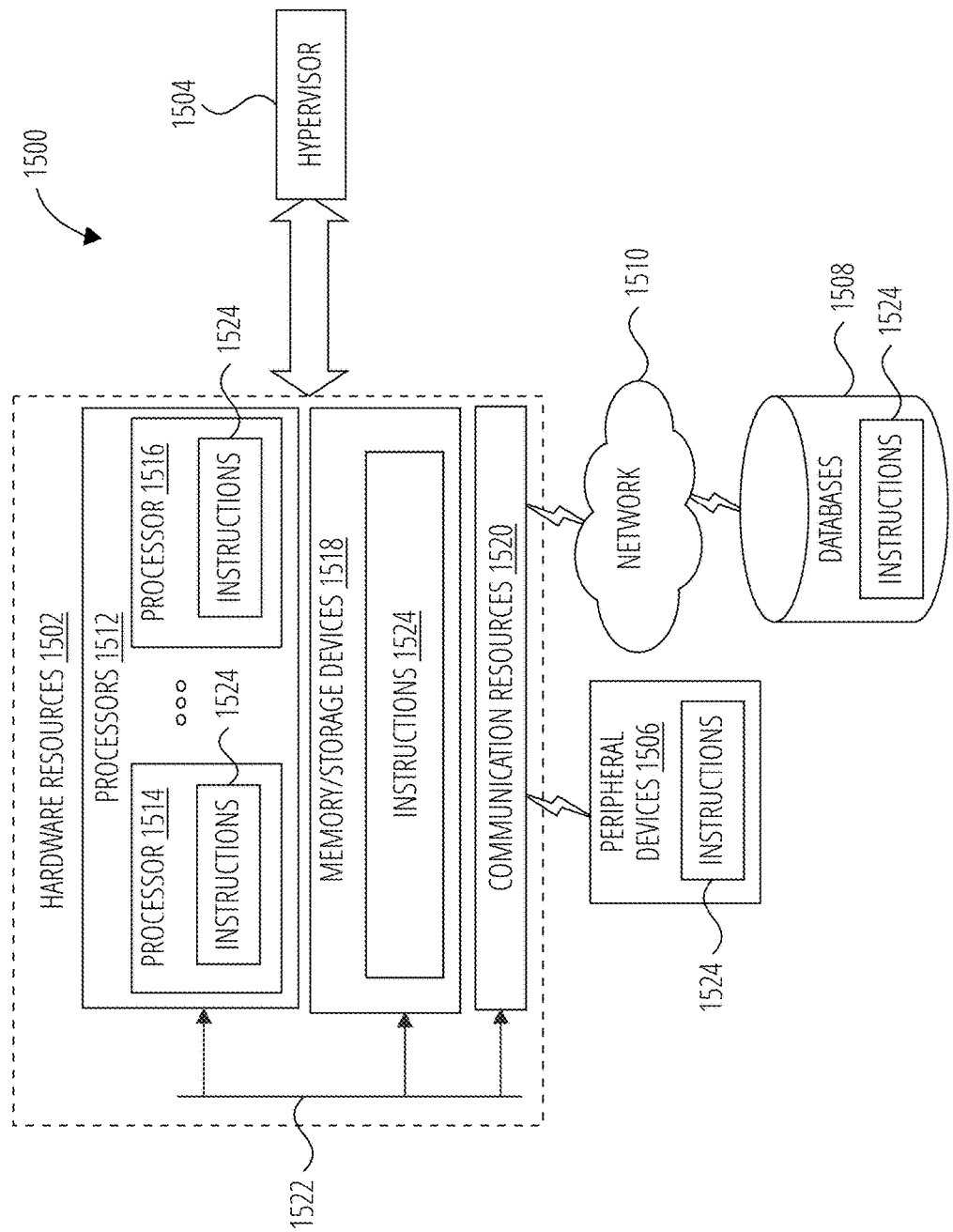
FIG. 15 illustrates components in accordance with one embodiment.

FIG. 15 is a block diagram illustrating components 1500, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1502 including one or more processors 1512 (or processor cores), one or more memory/storage devices 1518, and one or more communication resources 1520, each of which may be communicatively coupled via a bus 1522. For embodiments where node virtualization (e.g., NFV) is utilized, a hypervisor 1504 may be executed to provide an execution environment for one or more network slices/sub-slices to utilize the hardware resources 1502.

The processors 1512 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1514 and a processor 1516.

The memory/storage devices 1518 may include main memory, disk storage, or any suitable combination thereof. The memory/storage devices 1518 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1520 may include interconnection or network interface components or other suitable devices to communicate with one or more peripheral devices 1506 or one or more databases 1508 via a network 1510. For example, the communication resources 1520 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1524 may comprise software, a program, an application, an applet, an app, or other executable code for causing at least any of the processors 1512 to perform any one or more of the methodologies discussed herein. The instructions 1524 may reside, completely or partially, within at least one of the processors 1512 (e.g., within the processor's cache memory), the memory/storage devices 1518, or any suitable combination thereof. Furthermore, any portion of the instructions 1524 may be transferred to the hardware resources 1502 from any combination of the peripheral devices 1506 or the databases 1508. Accordingly, the memory of the processors 1512, the memory/storage devices 1518, the peripheral devices 1506, and the databases 1508 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is an apparatus for a user equipment (UE). The apparatus includes a memory interface to store system information in a memory device and a processor. The processor is configured to determine, from the system information, whether a carrier of the cellular network supports a standalone (SA) operation of a first RAT or a non-standalone (NSA) operation of the first RAT in cooperation with a second RAT. For the NSA operation of the first RAT in cooperation with the second RAT, the processor is configured to skip bands of the first RAT for an initial search or an out-of-service (OOS) search. For the SA operation of the first RAT, the processor is configured to: perform a storage list search (SLS), according to SLS search criteria, of recently used frequencies of at least the first RAT; in response to the SLS search criteria not being satisfied, perform a deviated band search (DBS), according to DBS search criteria, wherein for the first RAT the DBS is limited to configured bands of the carrier; and in response to the DBS search criteria not being satisfied, skip the bands of the first RAT in a remaining band search (RBS).

Example 2 includes the apparatus of Example 1, wherein the first RAT is a New Radio (NR) RAT and the second RAT is an Evolved Universal Terrestrial Radio Access Network (E-UTRAN) RAT, and wherein the NSA operation of the first RAT in cooperation with the second RAT comprises E-UTRAN NR-dual connectivity (EN-DC).

Example 3 includes the apparatus of Example 2, wherein to skip the bands of the first RAT comprises to skip measurements in a first frequency range FR1 and a second frequency range FR2 of the NR RAT and measure Long Term Evolution (LTE) bands of the E-UTRAN RAT for corresponding SLS, DBS, and RBS scans.

Example 4 includes the apparatus of Example 2, wherein the SA operation of the first RAT comprises dual connectivity using standalone control signaling through a Next Generation core (NGC) network for both the E-UTRAN RAT and NR RAT.

Example 5 includes the apparatus of any of Example 1 to Example 4, wherein the processor is further configured to, in a mobility state, determine that one or more neighbor cell has better radio frequency (RF) conditions than the cell.

Example 6 includes the apparatus of Example 5, wherein the processor is further configured to, for the NSA operation of the first RAT in cooperation with the second RAT: in radio resource control (RRC) connected mode, determine that a gapUE information element (IE) is configured for the UE, the gapUE IE indicating that a measurement gap configuration applies to a first frequency range FR1 and a second frequency range FR2; in response to determining that the gapUE IE is configured for the UE: if one or more cell is available in the first frequency range FR1, limit measurements to bands in the first frequency range FR1; and if the one or more cell is not available in the first frequency range FR1, perform measurements in bands of the second frequency range FR2.

Example 7 includes the apparatus of Example 6, wherein the processor is further configured to, in response to finding a standalone cell in the first RAT, process a system information block 24 (SIB24) to determine NR reselection parameters.

Example 8 includes the apparatus of Example 5, wherein the processor is further configured to, for the SA operation of the first RAT: in a radio resource control (RRC) idle mode wherein carrier settings persist, determine to perform reselection in the first RAT; define a local threshold to move from a first frequency range FR1 to a second frequency range FR2; and determine whether to perform UE reselection optimization based at least in part on the local threshold.

Example 9 includes the apparatus of Example 8, wherein to determine to perform the UE reselection optimization comprises to determine not to perform reselection between the first frequency range FR1 and the second frequency range FR2 unless a priority difference between the first frequency range FR1 and the second frequency range FR2 reaches a predetermined priority threshold.

Example 10 includes the apparatus of Example 8, wherein to determine to perform the UE reselection optimization comprises, in response to determining that a signal in a current frequency range is below the local threshold and no other signal is available in the current frequency range, search for suitable cells in another frequency range for idle mode reselection.

Example 11 is a method for user equipment (UE) to perform multi-radio access technology (RAT) searching in a cellular network. The method includes determining, from system information, whether a carrier of the cellular network supports a standalone (SA) operation of a first RAT or a non-standalone (NSA) operation of the first RAT in cooperation with a second RAT. For the NSA operation of the first RAT in cooperation with the second RAT, the method further includes skipping bands of the first RAT for an initial search or an out-of-service (OOS) search. For the SA operation of the first RAT, the method further includes: performing a storage list search (SLS), according to SLS search criteria, of recently used frequencies of at least the first RAT; in response to the SLS search criteria not being satisfied, performing a deviated band search (DBS), according to DBS search criteria, wherein for the first RAT the DBS is limited to configured bands of the carrier; and in response to the DBS search criteria not being satisfied, skipping the bands of the first RAT in a remaining band search (RBS).

Example 12 includes the method of Example 11, wherein the first RAT is a New Radio (NR) RAT and the second RAT is an Evolved Universal Terrestrial Radio Access Network (E-UTRAN) RAT, and wherein the NSA operation of the first RAT in cooperation with the second RAT comprises E-UTRAN NR-dual connectivity (EN-DC).

Example 13 includes the method of Example 12, wherein skipping the bands of the first RAT comprises skipping measurements in a first frequency range FR1 and a second frequency range FR2 of the NR RAT and measuring Long Term Evolution (LTE) bands of the E-UTRAN RAT for corresponding SLS, DBS, and RBS scans.

Example 14 includes the method of Example 12, wherein the SA operation of the first RAT comprises dual connectivity using standalone control signaling through a Next Generation core (NGC) network for both the E-UTRAN RAT and NR RAT.

Example 15 includes the method of any of Example 11 to Example 14, further comprising, in a mobility state, determining that one or more neighbor cell has better radio frequency (RF) conditions than the cell.

Example 16 includes the method of Example 15, further comprising, for the NSA operation of the first RAT in cooperation with the second RAT: in radio resource control (RRC) connected mode, determining that a gapUE information element (IE) is configured for the UE, the gapUE IE indicating that a measurement gap configuration applies to a first frequency range FR1 and a second frequency range FR2; in response to determining that the gapUE IE is configured for the UE: if one or more cell is available in the first frequency range FR1, limit measurements to bands in the first frequency range FR1; and if the one or more cell is not available in the first frequency range FR1, perform measurements in bands of the second frequency range FR2.

Example 17 includes the method of Example 16, further comprising, in response to finding a standalone cell in the first RAT, processing a system information block 24 (SIB24) to determine NR reselection parameters.

Example 18 includes the method of Example 15, further comprising, for the SA operation of the first RAT: in a radio resource control (RRC) idle mode wherein carrier settings persist, opting to perform reselection in the first RAT; defining a local threshold to move from a first frequency range FR1 to a second frequency range FR2; and determining whether to perform UE reselection optimization based at least in part on the local threshold.

Example 19 includes the method of Example 18, wherein determining to perform the UE reselection optimization comprises determining not to perform reselection between the first frequency range FR1 and the second frequency range FR2 unless a priority difference between the first frequency range FR1 and the second frequency range FR2 reaches a predetermined priority threshold.

Example 20 includes the method of Example 18, wherein determining to perform the UE reselection optimization comprises, in response to determining that a signal in a current frequency range is below the local threshold and no other signal is available in the current frequency range, searching for suitable cells in another frequency range for idle mode reselection.

Example 21 is a computer-readable storage medium. The computer-readable storage medium including instructions that when executed by a processor, cause the computer to: determine, from system information, whether a carrier of the cellular network supports a standalone (SA) operation of a first RAT or a non-standalone (NSA) operation of the first RAT in cooperation with a second RAT; for the NSA operation of the first RAT in cooperation with the second RAT, skip bands of the first RAT for an initial search or an out-of-service (OOS) search; and for the SA operation of the first RAT: perform a storage list search (SLS), according to SLS search criteria, of recently used frequencies of at least the first RAT; in response to the SLS search criteria not being satisfied, perform a deviated band search (DBS), according to DBS search criteria, wherein for the first RAT the DBS is limited to configured bands of the carrier; and in response to the DBS search criteria not being satisfied, skip the bands of the first RAT in a remaining band search (RBS).

Example 22 includes the computer-readable storage medium of Example 21, wherein the first RAT is a New Radio (NR) RAT and the second RAT is an Evolved Universal Terrestrial Radio Access Network (E-UTRAN) RAT, and wherein the NSA operation of the first RAT in cooperation with the second RAT comprises E-UTRAN NR-dual connectivity (EN-DC).

Example 23 includes the computer-readable storage medium of Example 22, wherein to skip the bands of the first RAT comprises to skip measurements in a first frequency range FR1 and a second frequency range FR2 of the NR RAT and measure Long Term Evolution (LTE) bands of the E-UTRAN RAT for corresponding SLS, DBS, and RBS scans.

Example 24 includes the computer-readable storage medium of Example 22, wherein the SA operation of the first RAT comprises dual connectivity use standalone control signaling through a Next Generation core (NGC) network for both the E-UTRAN RAT and NR RAT.

Example 25 may include an apparatus comprising means to perform one or more elements of a method described in or related to any of the above Examples, or any other method or process described herein.

Example 26 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 27 may include an apparatus comprising logic, modules, or circuitry to perform one or more elements of a method described in or related to any of the above Examples, or any other method or process described herein.

Example 28 may include a method, technique, or process as described in or related to any of the above Examples, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 30 may include a signal as described in or related to any of the above Examples, or portions or parts thereof.

Example 31 may include a datagram, packet, frame, segment, protocol data unit (PDU), or message as described in or related to any of the above Examples, or portions or parts thereof, or otherwise described in the present disclosure.

Example 32 may include a signal encoded with data as described in or related to any of the above Examples, or portions or parts thereof, or otherwise described in the present disclosure.

Example 33 may include a signal encoded with a datagram, packet, frame, segment, PDU, or message as described in or related to any of the above Examples, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 34 may include a computer program comprising instructions, wherein execution of the program by a processing element is to cause the processing element to carry out the method, techniques, or process as described in or related to any of the above Examples, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE), comprising:
a memory interface to store system information in a memory device; and
a processor configured to:
determine, from the system information, that a carrier supports a standalone (SA) operation of a first radio access technology (RAT); and
for the SA operation of the first RAT:
perform a storage list search (SLS), according to SLS search criteria, of recently used frequencies of at least the first RAT;
in response to the SLS search criteria not being satisfied, perform a deviated band search (DBS), according to DBS search criteria, wherein for the first RAT the DBS is limited to configured bands of the carrier; and
in response to the DBS search criteria not being satisfied, skip bands of the first RAT in a remaining band search (RBS).

2. The UE of claim 1, wherein the first RAT comprises a New Radio (NR) RAT, and wherein a second RAT comprises an Evolved Universal Terrestrial Radio Access Network (E-UTRAN) RAT.

3. The UE of claim 2, wherein to skip the bands of the first RAT comprises to skip measurements in a first frequency range FR1 and a second frequency range FR2 of the NR RAT and measure Long Term Evolution (LTE) bands of the E-UTRAN RAT for corresponding scans of the SLS, the DBS, and the RBS.

4. The UE of claim 2, wherein the SA operation of the first RAT comprises dual connectivity using standalone control signaling through a Next Generation core (NGC) network for both the E-UTRAN RAT and NR RAT.

5. The UE of claim 1, wherein the processor is further configured to, in a mobility state, determine that one or more neighbor cell has better radio frequency (RF) conditions than the cell.

6. The UE of claim 5, wherein the processor is further configured to, for the SA operation of the first RAT:
in a radio resource control (RRC) idle mode wherein carrier settings persist, determine to perform reselection in the first RAT;
define a local threshold to move from a first frequency range FR1 to a second frequency range FR2; and
determine whether to perform UE reselection optimization based at least in part on the local threshold.

7. The UE of claim 6, wherein to determine to perform the UE reselection optimization comprises to determine not to perform reselection between the first frequency range FR1 and the second frequency range FR2 unless a priority difference between the first frequency range FR1 and the second frequency range FR2 reaches a predetermined priority threshold.

8. The UE of claim 6, wherein to determine to perform the UE reselection optimization comprises, in response to determining that a signal in a current frequency range is below the local threshold and no other signal is available in the current frequency range, search for suitable cells in another frequency range for idle mode reselection.

9. A user equipment (UE), comprising:
a memory interface to store system information in a memory device; and
a processor configured to:
determine, from the system information, that a carrier supports a non-standalone (NSA) operation of a first radio access technology (RAT) in cooperation with a second RAT; and
for the NSA operation of the first RAT in cooperation with the second RAT, skip bands of the first RAT for an initial search or an out-of-service (OOS) search.

10. The UE of claim 9, wherein the first RAT is a New Radio (NR) RAT and the second RAT is an Evolved Universal Terrestrial Radio Access Network (E-UTRAN) RAT, and wherein the NSA operation of the first RAT in cooperation with the second RAT comprises E-UTRAN NR-dual connectivity (EN-DC).

11. The UE of claim 10, wherein to skip the bands of the first RAT comprises to skip measurements in a first frequency range FR1 and a second frequency range FR2 of the NR RAT and measure Long Term Evolution (LTE) bands of the E-UTRAN RAT for corresponding scans of a storage list search (SLS), a deviated band search (DBS), and a remaining band search (RBS).

12. The UE of claim 9, wherein the processor is further configured to, in a mobility state, determine that one or more neighbor cell has better radio frequency (RF) conditions than the cell.

13. The UE of claim 12, wherein the processor is further configured to, for the NSA operation of the first RAT in cooperation with the second RAT:
in radio resource control (RRC) connected mode, determine that a gapUE information element (IE) is configured for the UE, the gapUE IE indicating that a measurement gap configuration applies to a first frequency range FR1 and a second frequency range FR2;
in response to determining that the gapUE IE is configured for the UE:
if one or more cell is available in the first frequency range FR1, limit measurements to bands in the first frequency range FR1; and
if the one or more cell is not available in the first frequency range FR1, perform measurements in bands of the second frequency range FR2.

14. The UE of claim 13, wherein the processor is further configured to, in response to finding a standalone cell in the first RAT, process a system information block 24 (SIB24) to determine NR reselection parameters.

15. A method for user equipment (UE) to perform multi-radio access technology (RAT) searching in a cellular network, the method comprising:
determining, from system information, that a carrier of the cellular network supports a non-standalone (NSA) operation of a first RAT in cooperation with a second RAT;
for the NSA operation of the first RAT in cooperation with the second RAT, skipping bands of the first RAT for an initial search or an out-of-service (OOS) search.

16. The method of claim 15, wherein the first RAT is a New Radio (NR) RAT and the second RAT is an Evolved Universal Terrestrial Radio Access Network (E-UTRAN) RAT, and wherein the NSA operation of the first RAT in cooperation with the second RAT comprises E-UTRAN NR-dual connectivity (EN-DC).

17. The method of claim 16, wherein skipping the bands of the first RAT comprises skipping measurements in a first frequency range FR1 and a second frequency range FR2 of the NR RAT and measuring Long Term Evolution (LTE) bands of the E-UTRAN RAT for corresponding scans of a storage list search (SLS), a deviated band search (DBS), and a remaining band search (RBS).

18. The method of claim 15, further comprising, in a mobility state, determining that one or more neighbor cell has better radio frequency (RF) conditions than the cell.

19. The method of claim 18, further comprising, for the NSA operation of the first RAT in cooperation with the second RAT:
in radio resource control (RRC) connected mode, determining that a gapUE information element (IE) is configured for the UE, the gapUE IE indicating that a measurement gap configuration applies to a first frequency range FR1 and a second frequency range FR2;
in response to determining that the gapUE IE is configured for the UE:
if one or more cell is available in the first frequency range FR1, limit measurements to bands in the first frequency range FR1; and
if the one or more cell is not available in the first frequency range FR1, perform measurements in bands of the second frequency range FR2.

20. The method of claim 19, further comprising, in response to finding a standalone cell in the first RAT, processing a system information block 24 (SIB24) to determine NR reselection parameters.

* * * * *